United States Patent
Kitayama et al.

(10) Patent No.: US 10,218,874 B2
(45) Date of Patent: Feb. 26, 2019

(54) INFORMATION PROCESSING SYSTEM, INFORMATION PROCESSING APPARATUS, INFORMATION PROCESSING METHOD, AND INFORMATION PROCESSING PROGRAM

(71) Applicants: Akiko Kitayama, Kanagawa (JP); Yuto Shibata, Kanagawa (JP); Keisuke Nakazawa, Kanagawa (JP)

(72) Inventors: Akiko Kitayama, Kanagawa (JP); Yuto Shibata, Kanagawa (JP); Keisuke Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/558,311

(22) PCT Filed: Apr. 25, 2016

(86) PCT No.: PCT/JP2016/002178
§ 371 (c)(1),
(2) Date: Sep. 14, 2017

(87) PCT Pub. No.: WO2016/181624
PCT Pub. Date: Nov. 17, 2016

(65) Prior Publication Data
US 2018/0063367 A1 Mar. 1, 2018

(30) Foreign Application Priority Data
May 14, 2015 (JP) .................... 2015-098937

(51) Int. Cl.
*H04N 1/327* (2006.01)
*G03G 15/00* (2006.01)
(Continued)

(52) U.S. Cl.
CPC ........ *H04N 1/32771* (2013.01); *B41J 29/393* (2013.01); *G03G 15/5016* (2013.01);
(Continued)

(58) Field of Classification Search
CPC ........... H04N 1/32771; H04N 1/32122; H04N 2201/0094; H04N 2201/3202; H04N 2201/3207; G03G 15/5016; B41J 29/393
(Continued)

(56) References Cited

U.S. PATENT DOCUMENTS 9,628,665 B2  4/2017  Okada et al.
2007/0076229 A1*  4/2007  Kim ..................... G06Q 10/109
358/1.1
(Continued)

FOREIGN PATENT DOCUMENTS

EP     2779611      9/2014
JP     2007-251433  9/2007
(Continued)

OTHER PUBLICATIONS

International Search Report dated Aug. 2, 2016 in PCT/JP2016/002178 filed on Apr. 25, 2016.
(Continued)

*Primary Examiner* — Saeid Ebrahimi Dehkordy
(74) *Attorney, Agent, or Firm* — IPUSA, PLLC

(57) ABSTRACT

An information processing system includes a first information processing device and a second information processing device that operates based on a request received from the first information processing device. The first information processing device includes a processor configured to implement a storage unit that stores a portion of information stored in the second information processing device, and a first communication control unit that transmits a job execution request to the second information processing device
(Continued)

based on the stored information. When a communication connection between the first and second information processing devices is not established, the transmission of the job execution request is controlled to transmit the job execution request based on the portion of the information after the communication connection is established. The second information processing device executes a predetermined job based on the job execution request received from the first information processing device.

13 Claims, 22 Drawing Sheets

(51) Int. Cl.
*B41J 29/393* (2006.01)
*H04N 1/32* (2006.01)
*G06F 3/12* (2006.01)

(52) U.S. Cl.
CPC ..... *G03G 15/5087* (2013.01); *H04N 1/32122* (2013.01); *G06F 3/121* (2013.01); *G06F 3/1234* (2013.01); *G06F 3/1236* (2013.01); *G06F 3/1267* (2013.01); *G06F 3/1284* (2013.01); *H04N 2201/0094* (2013.01); *H04N 2201/3202* (2013.01); *H04N 2201/3207* (2013.01)

(58) Field of Classification Search
USPC ........................................................ 358/1.15
See application file for complete search history.

(56) References Cited

U.S. PATENT DOCUMENTS

| 2010/0020353 | A1* | 1/2010 | Yamaguchi | H04N 1/00 |
| | | | | 358/1.15 |
| 2012/0147436 | A1 | 6/2012 | Nishiyama | |
| 2014/0198342 | A1 | 7/2014 | Nakabayashi et al. | |
| 2015/0138593 | A1 | 5/2015 | Iizuka | |
| 2015/0146253 | A1* | 5/2015 | Uruma | H04N 1/00832 |
| | | | | 358/1.15 |

FOREIGN PATENT DOCUMENTS

| JP | 2010-038998 | 2/2010 |
| JP | 2010-146523 | 7/2010 |
| JP | 2014-230255 | 12/2014 |
| JP | 2016-099812 | 5/2016 |
| WO | 2013/175728 | 11/2013 |

OTHER PUBLICATIONS

Extended European Search Report for 16792354.9 dated May 4, 2018.

* cited by examiner

[Fig. 1]
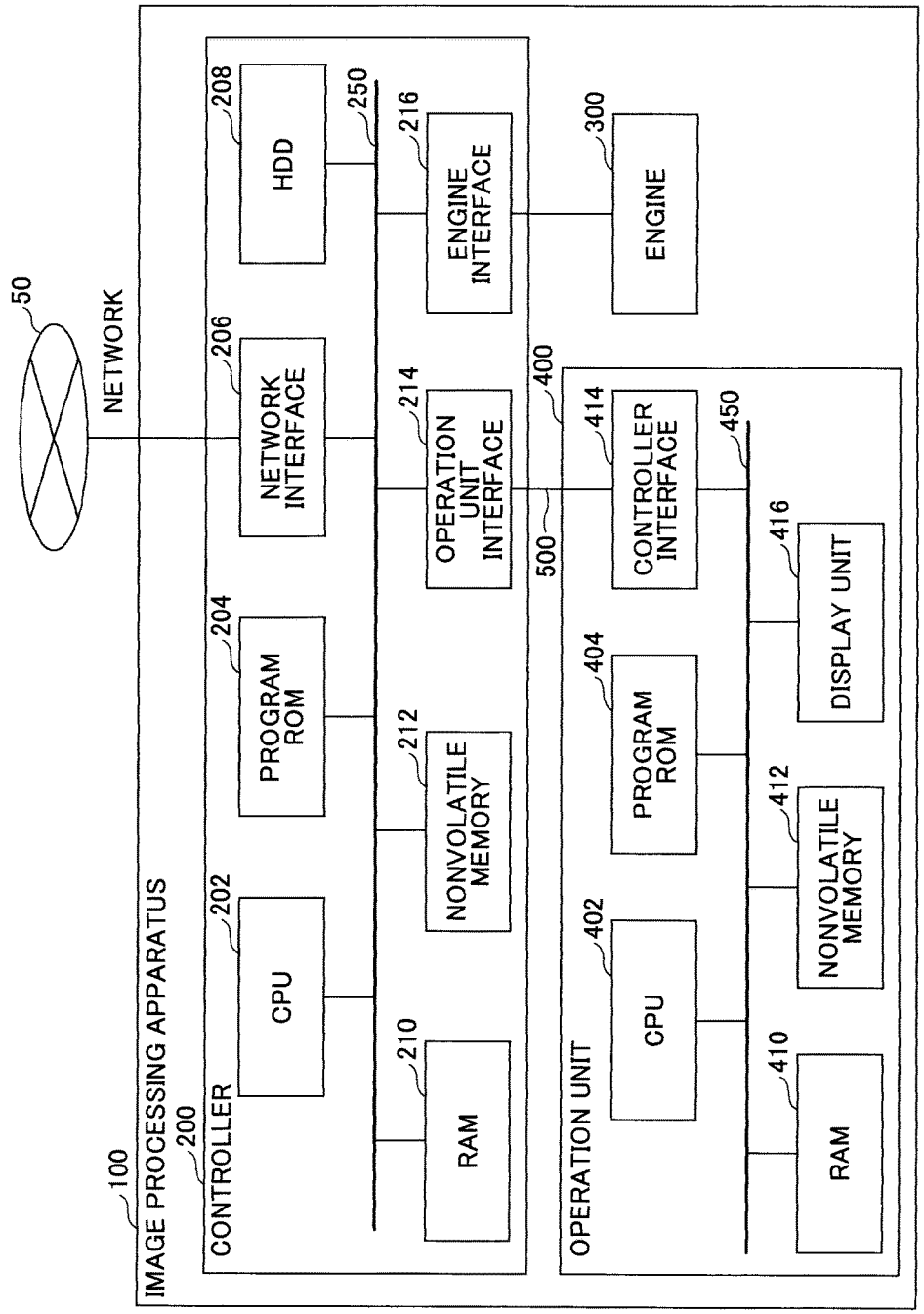

[Fig. 2]
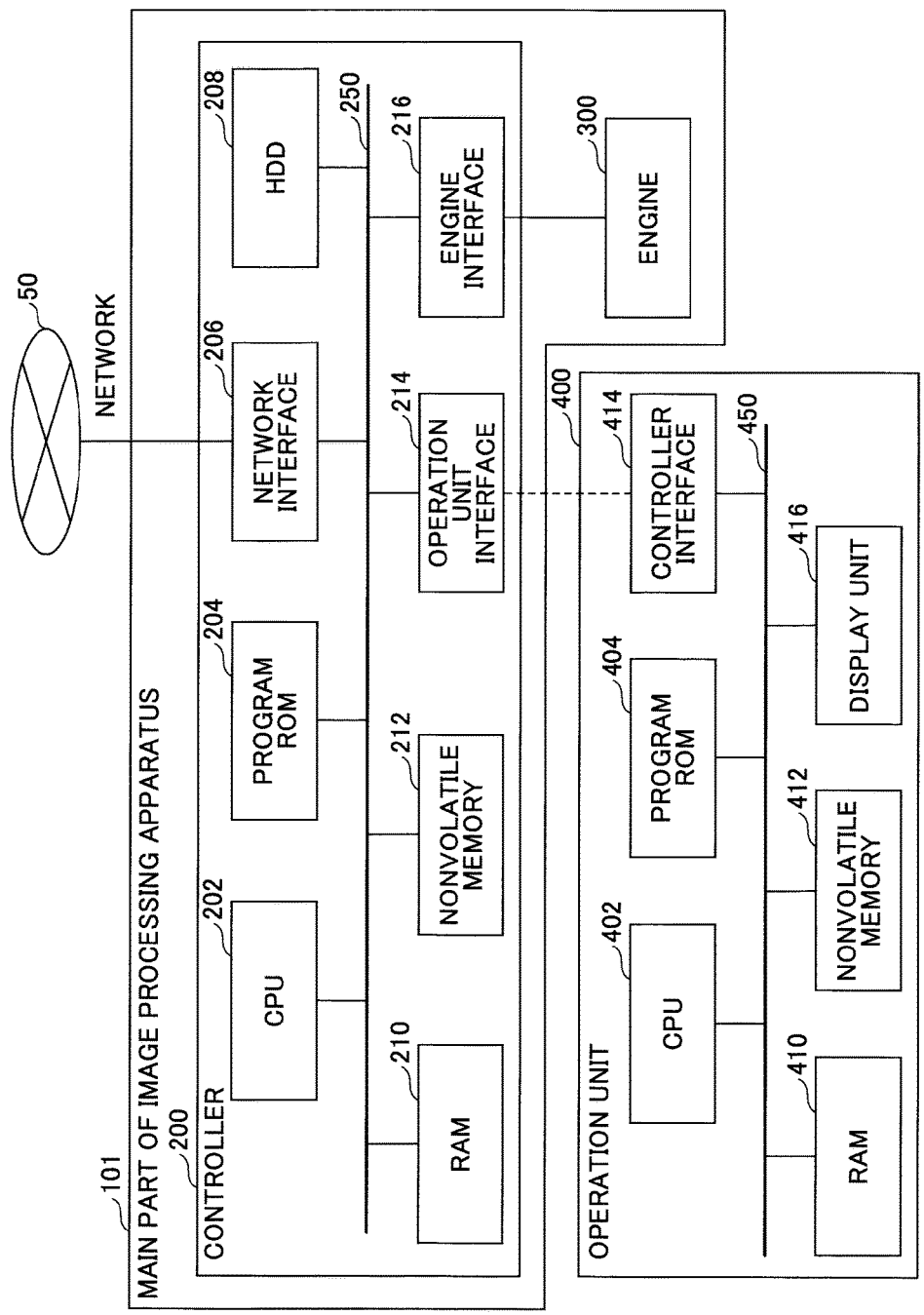

[Fig. 3]
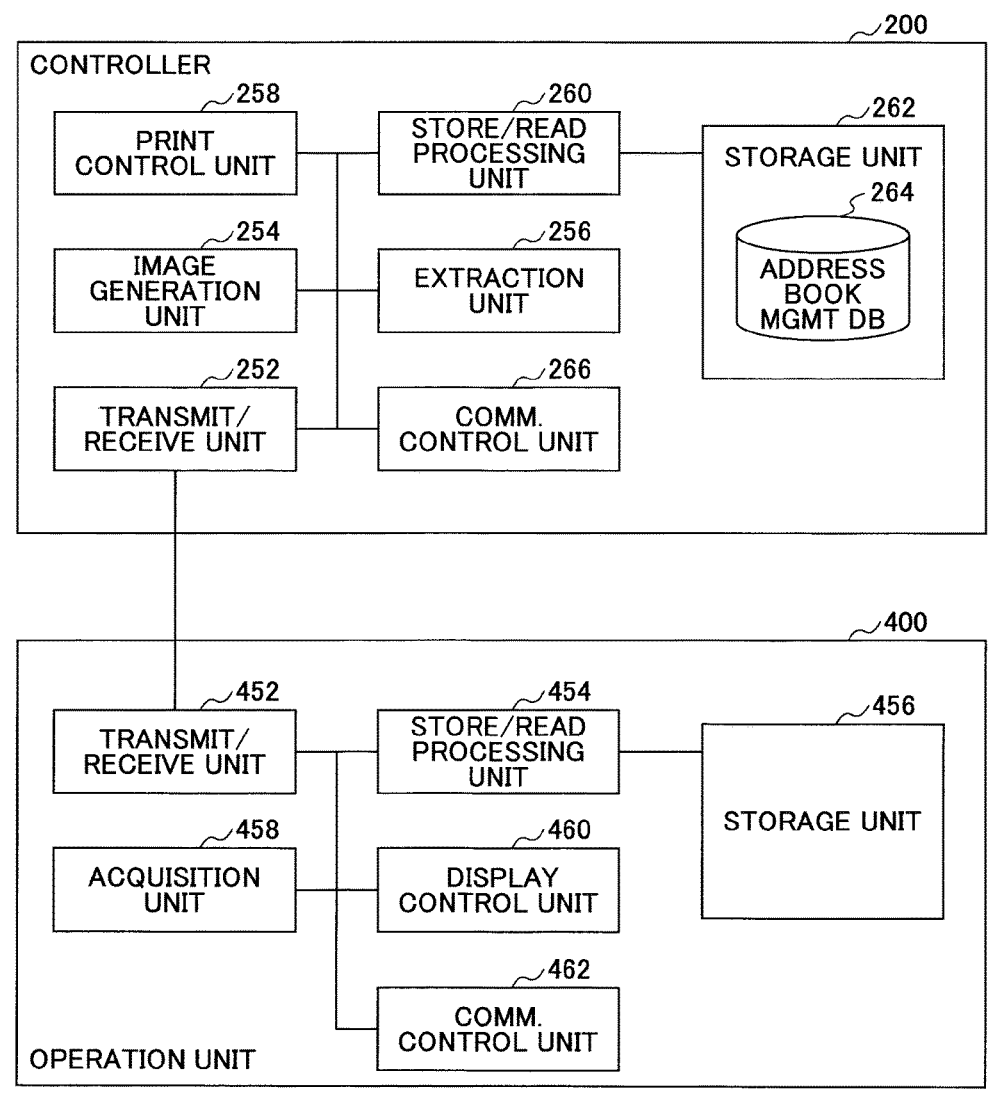

[Fig. 4]

| ADDRESS ID | DISPLAY NAME | MAIL ADDRESS | FAX NUMBER | LINE SELECTION INFO. | VERSION INFO. |
|---|---|---|---|---|---|
| 001 | AAA | A@aaa.com | 111-222-333 | G3 | Ver.1.2 |
| 002 | BBB | B@bbb.com | 444-555-666 | G4 | Ver.1.3 |
| 003 | CCC | C@ccc.com | 777-888-999 | G3 | Ver.1.2 |
| ... | ... | ... | ... | ... | ... |

[Fig. 5]
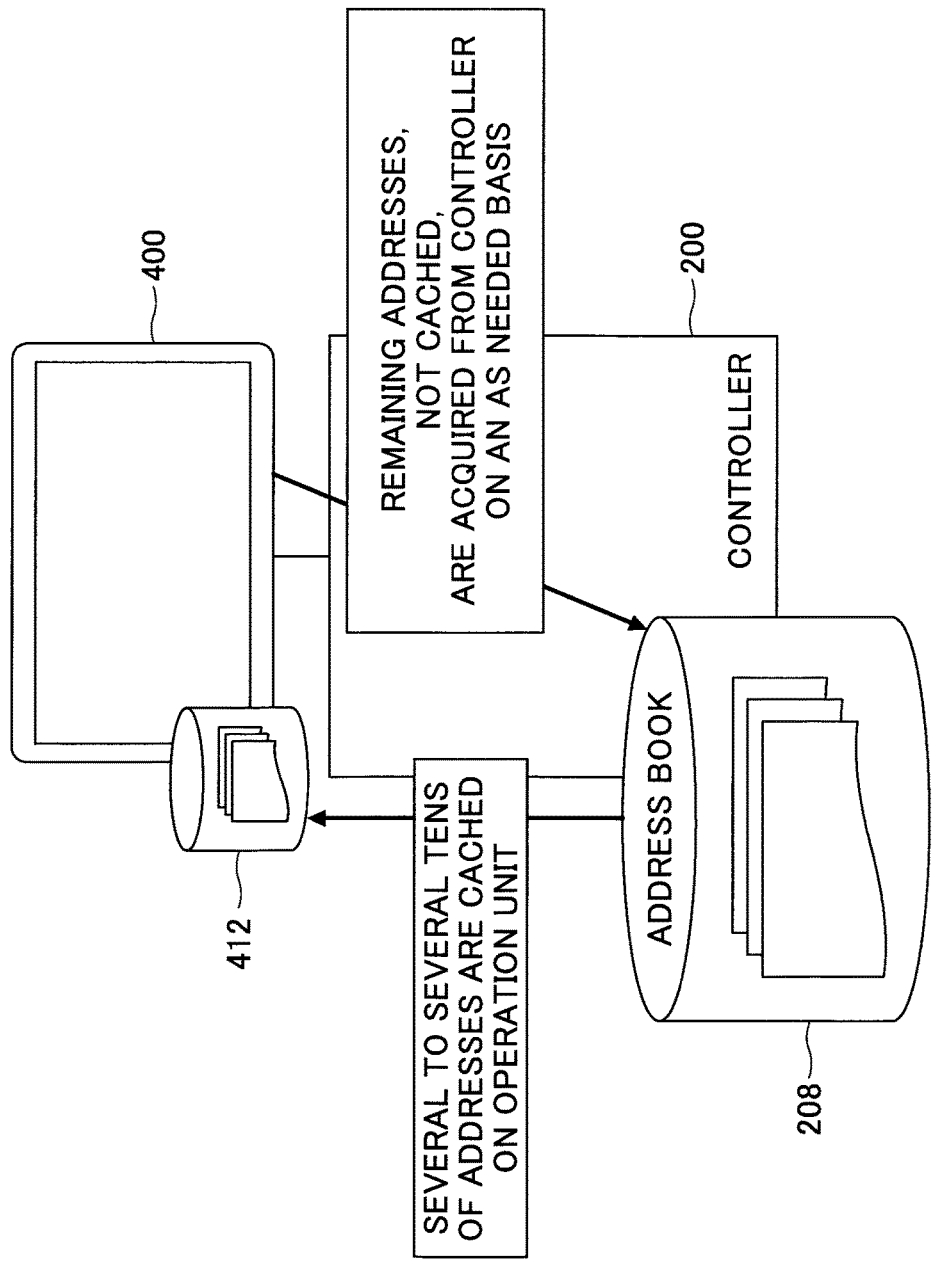

[Fig. 6]
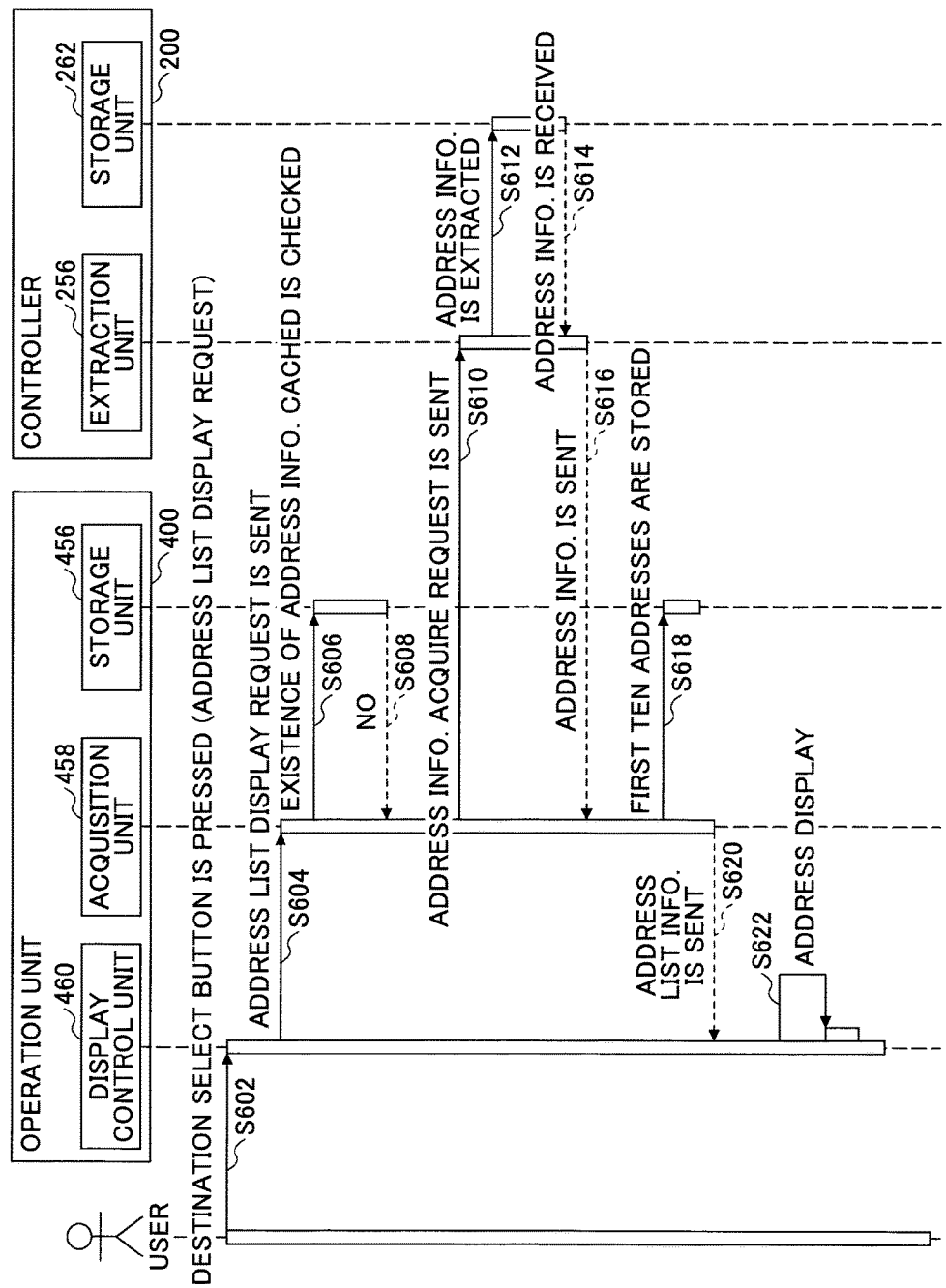

[Fig. 7]
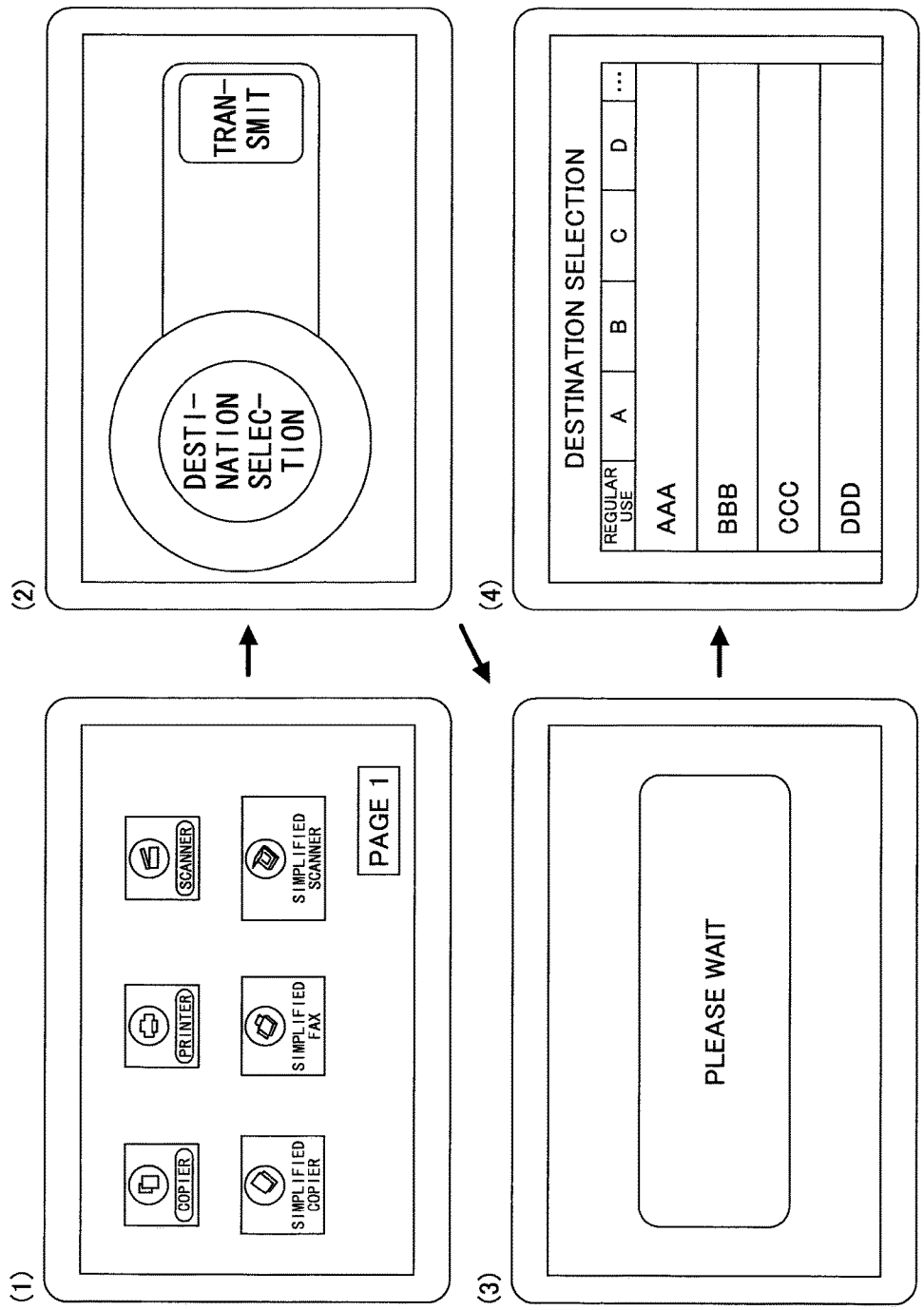

[Fig. 8]
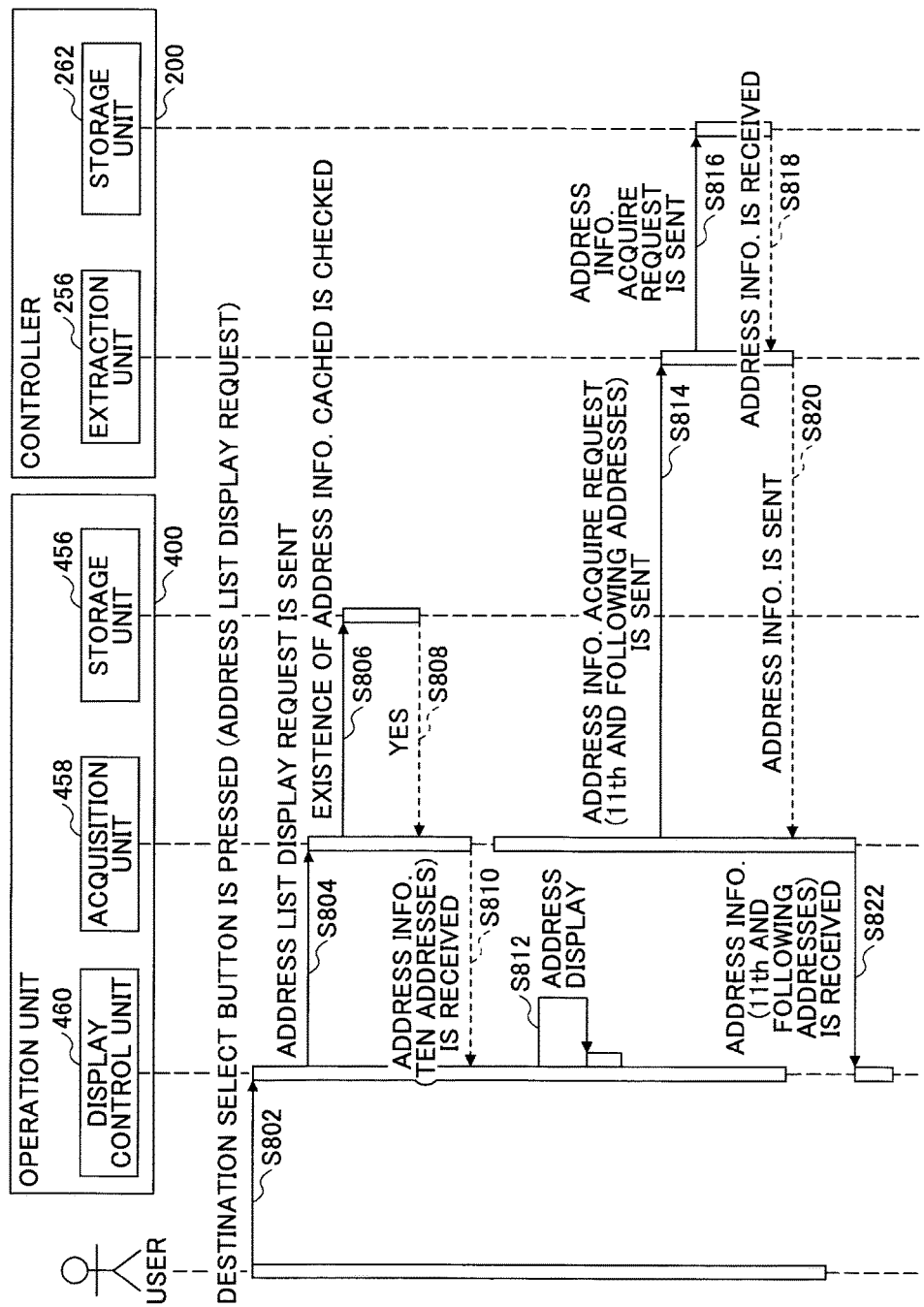

[Fig. 9]
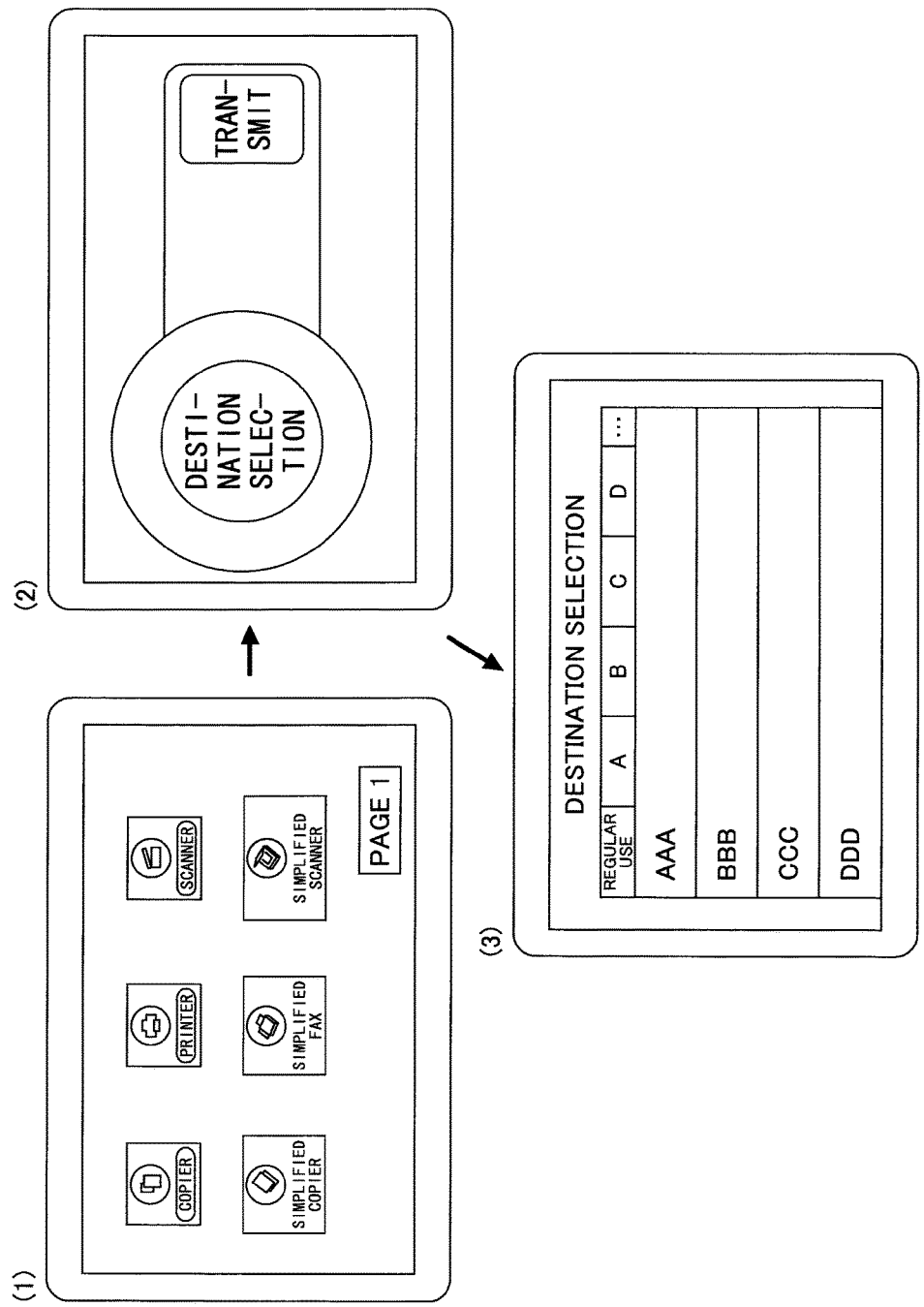

[Fig. 10]
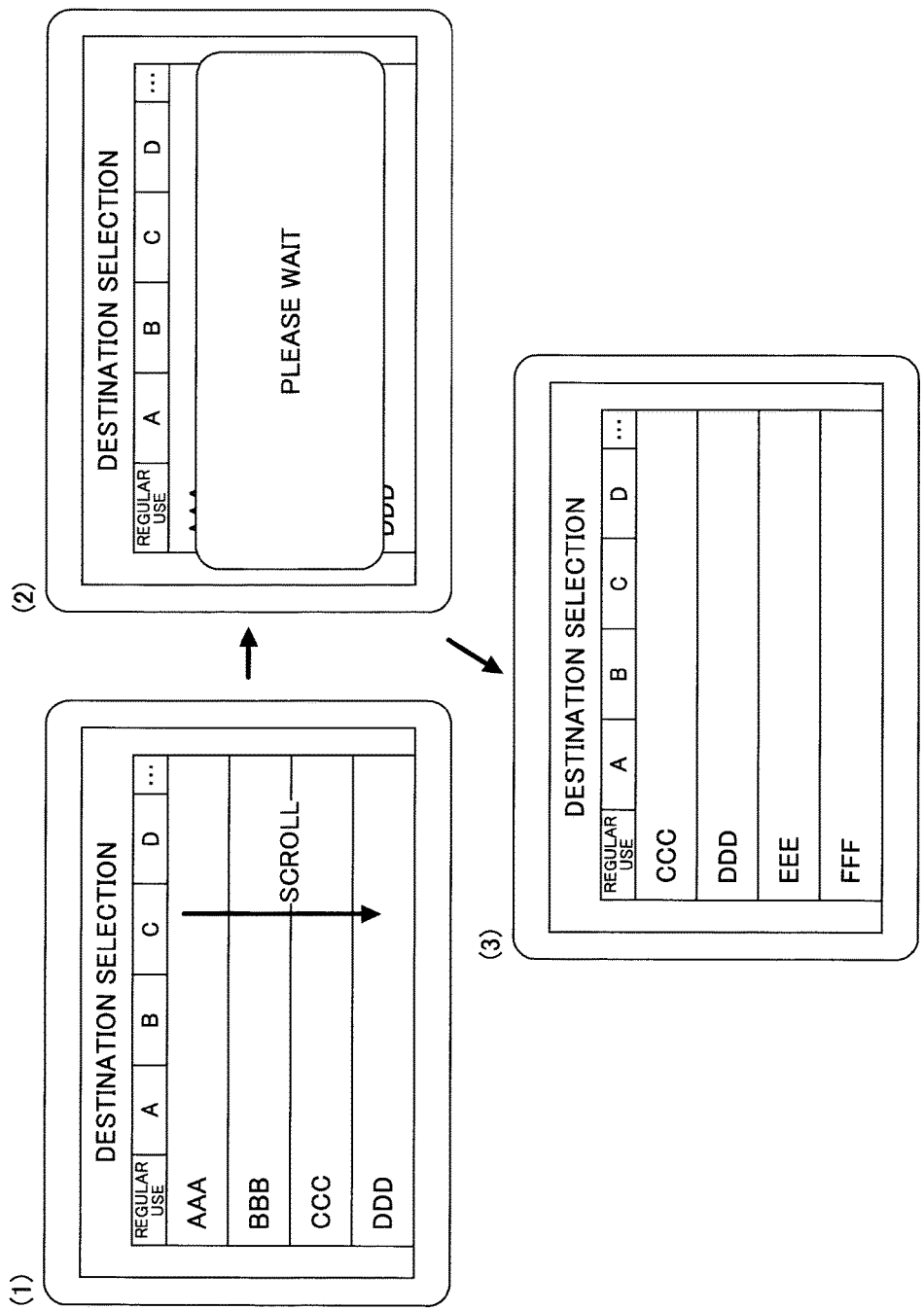

[Fig. 11]
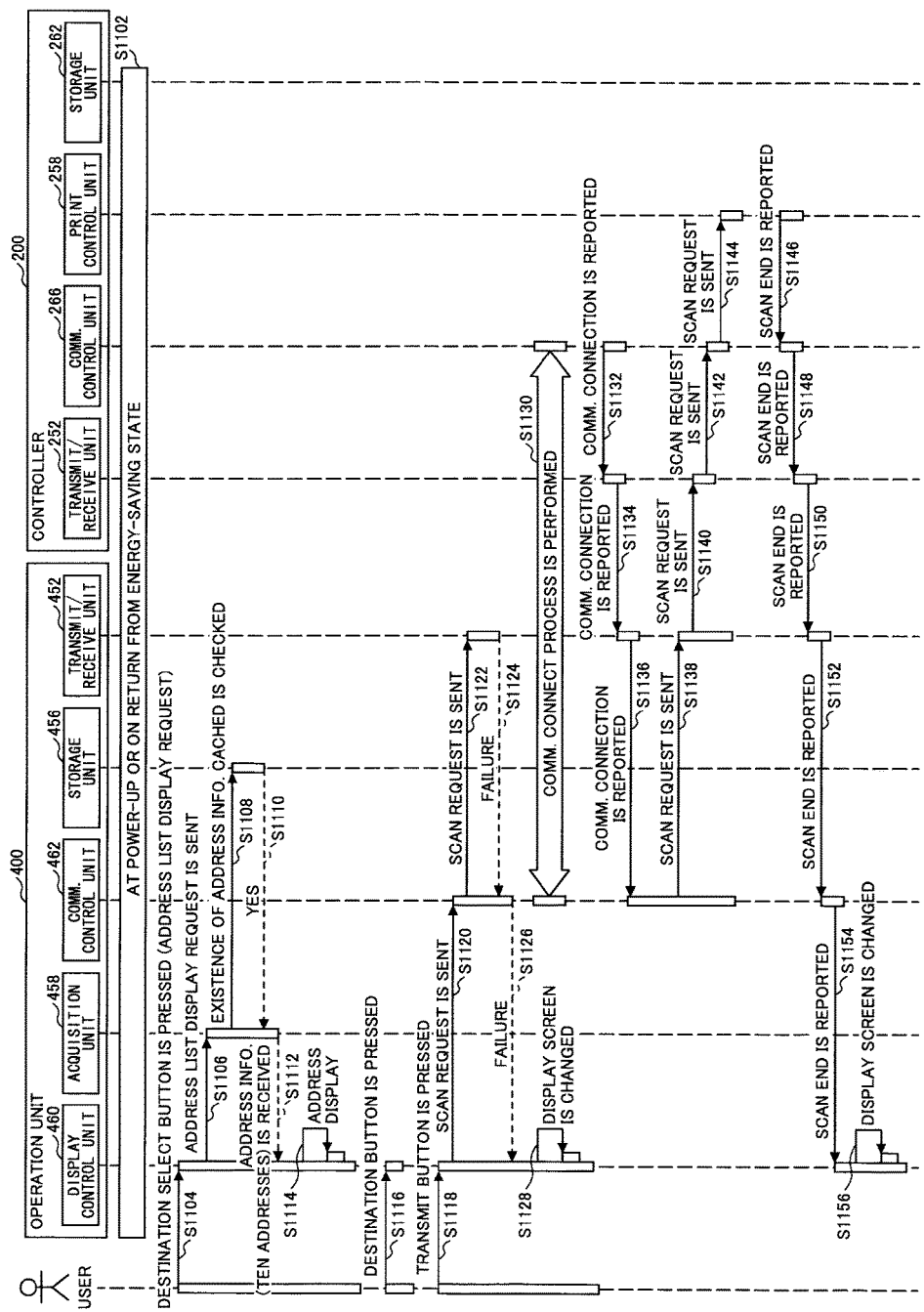

[Fig. 12]
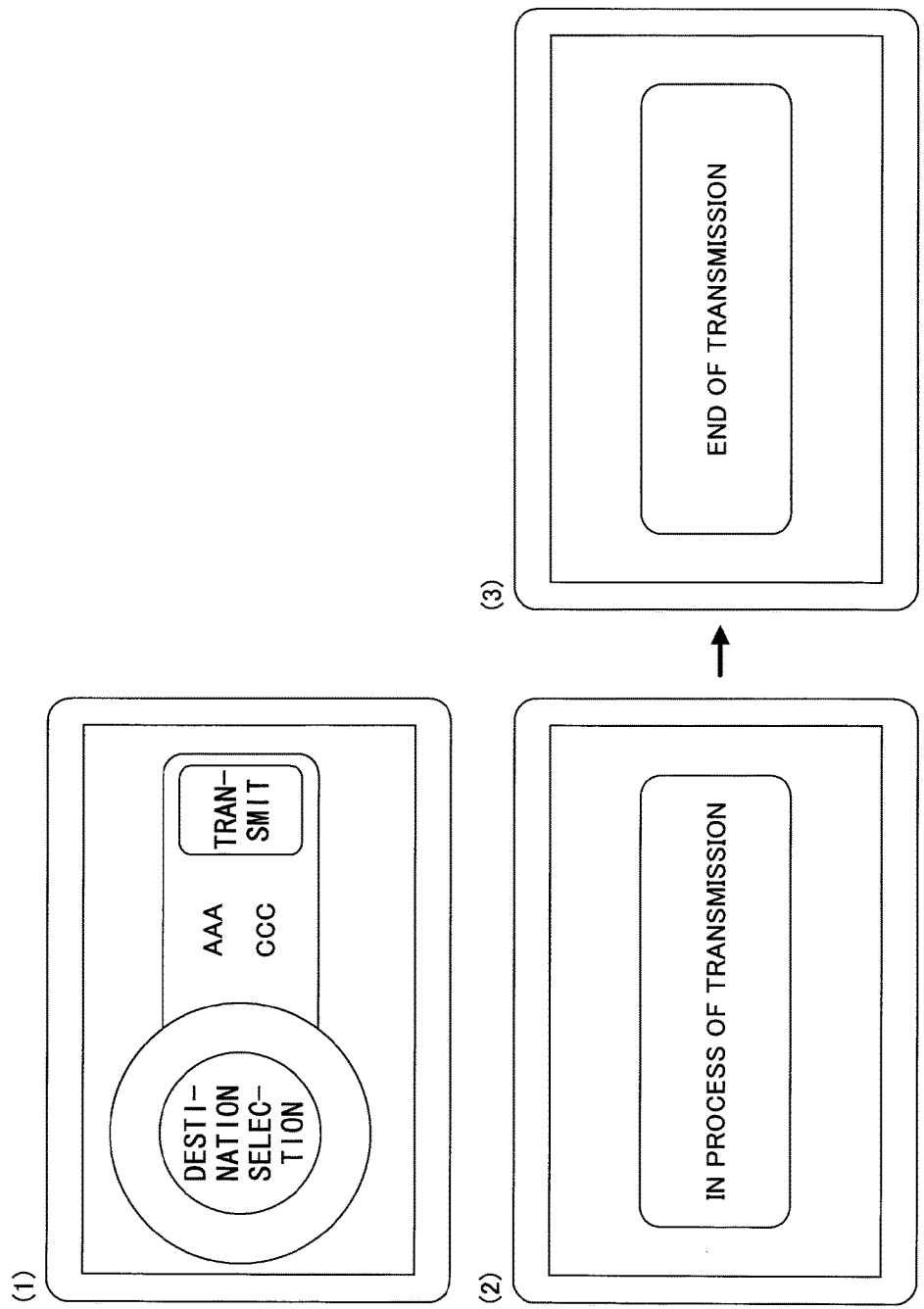

[Fig. 13]
(1)
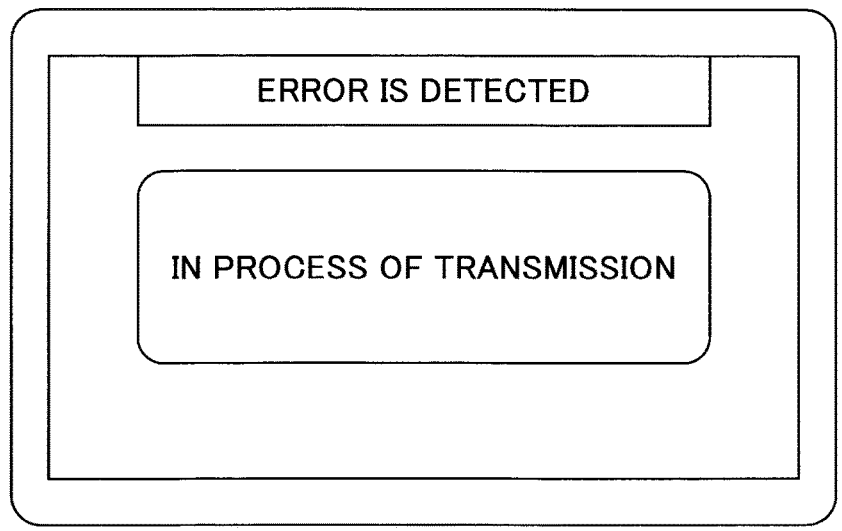
(2)
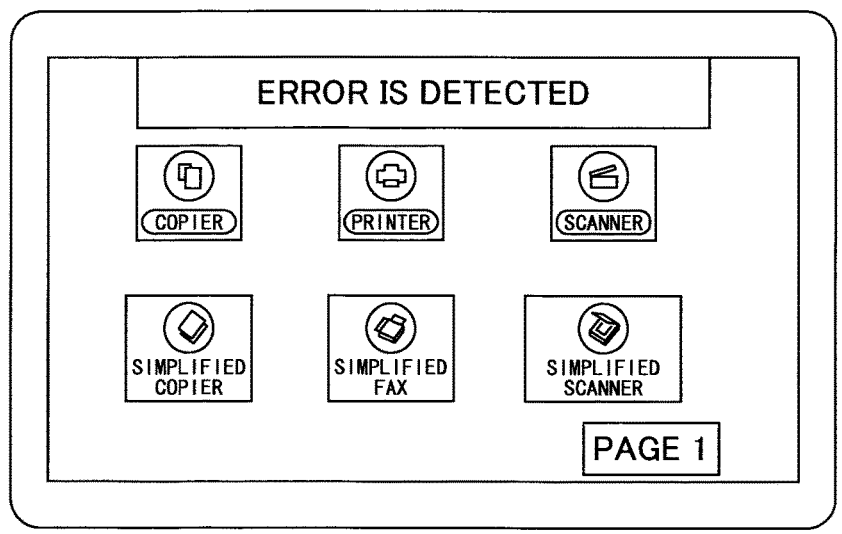

[Fig. 14]
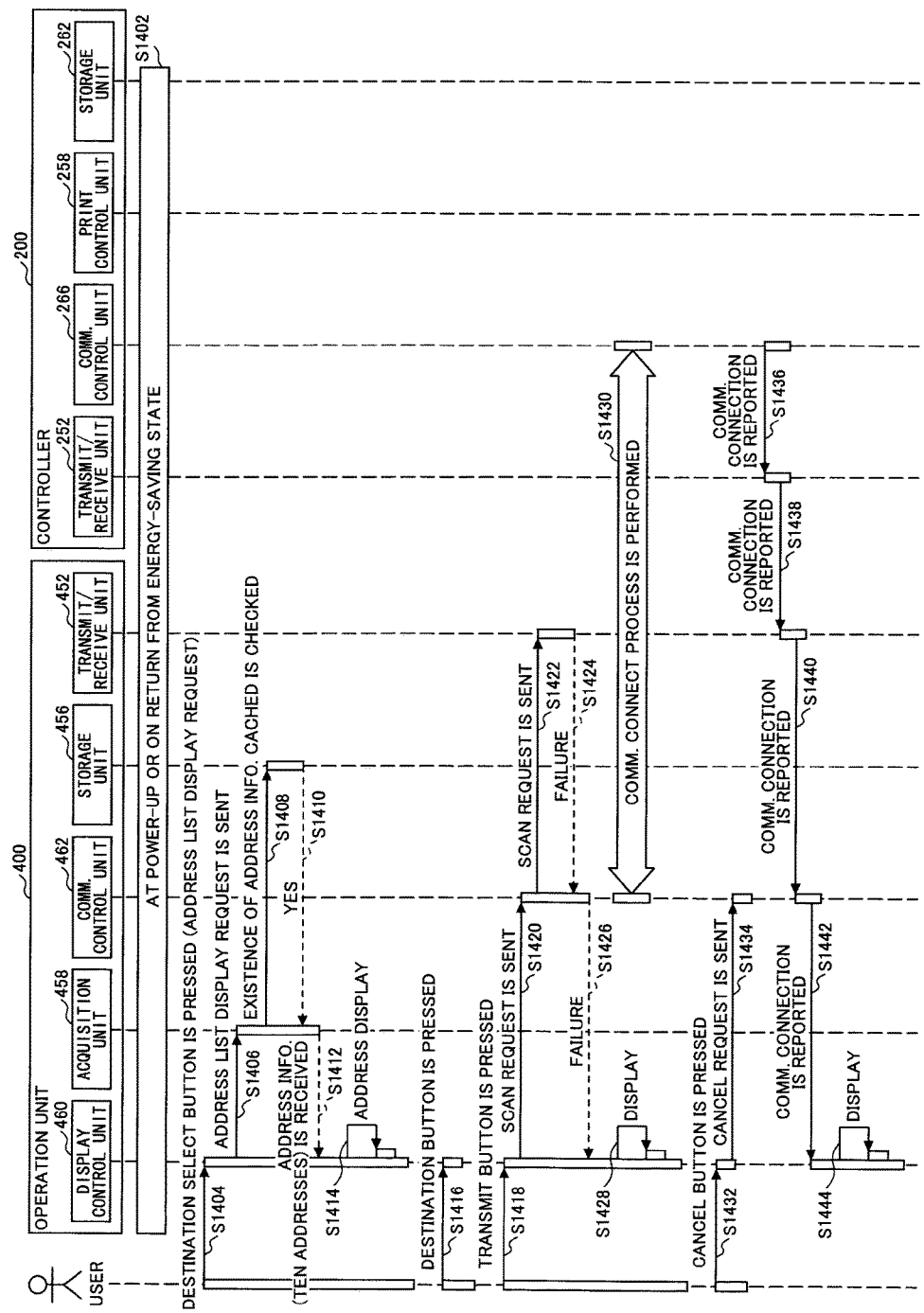

[Fig. 15]
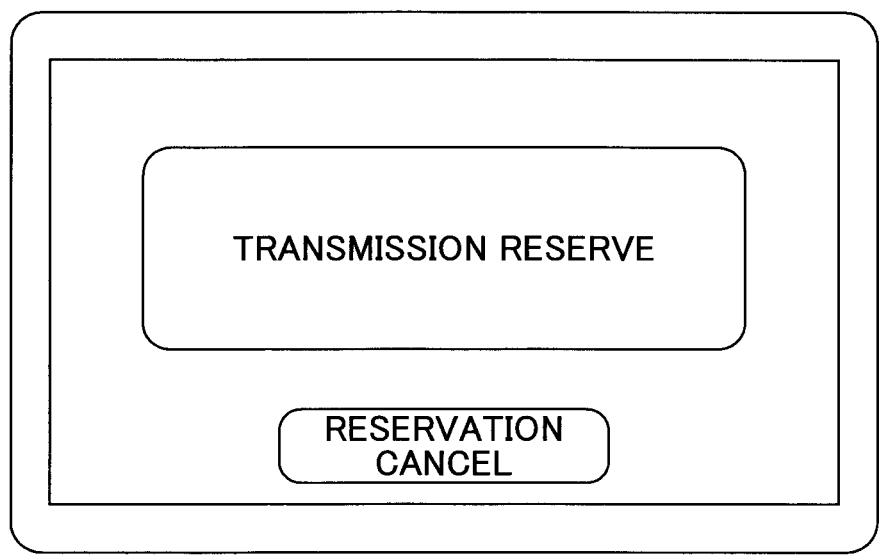

[Fig. 16]
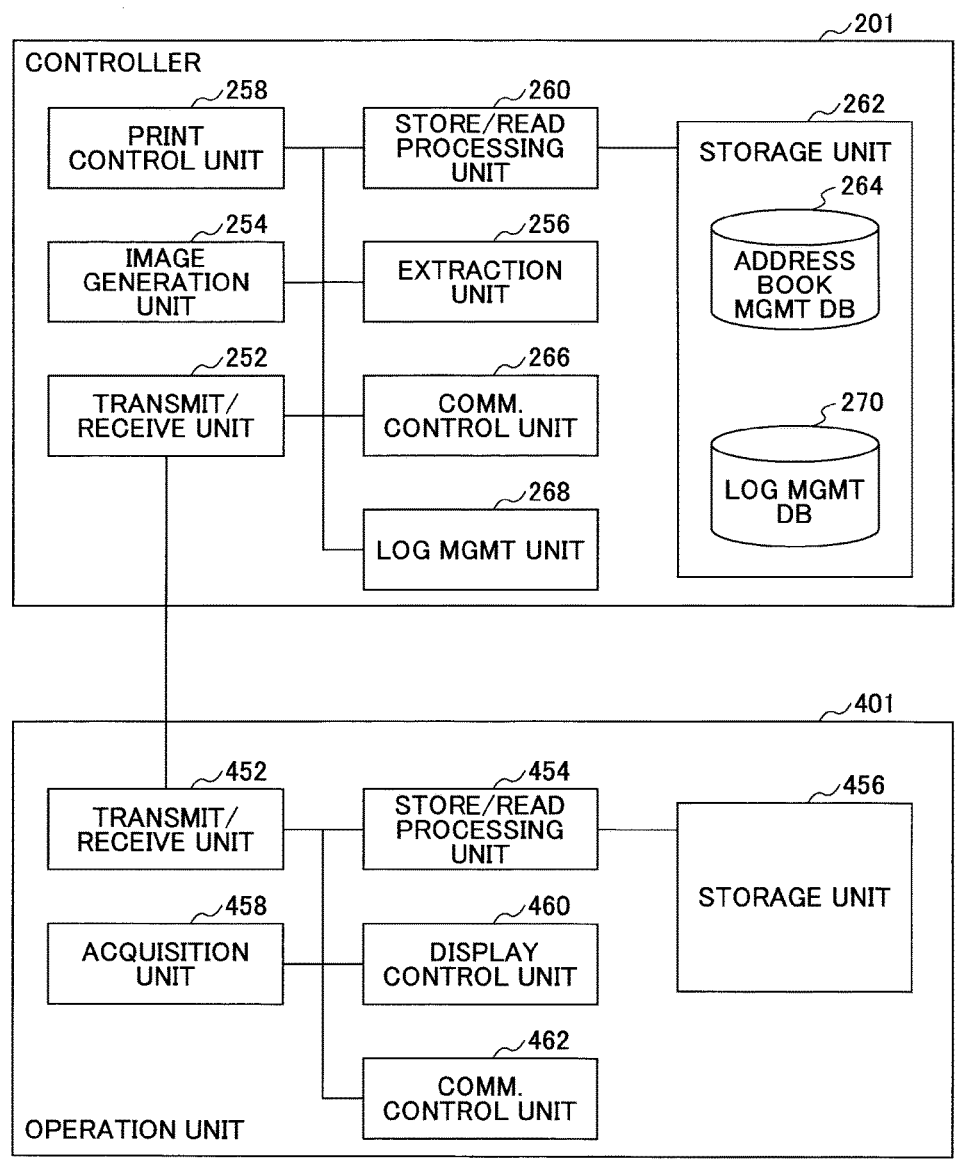

[Fig. 17]
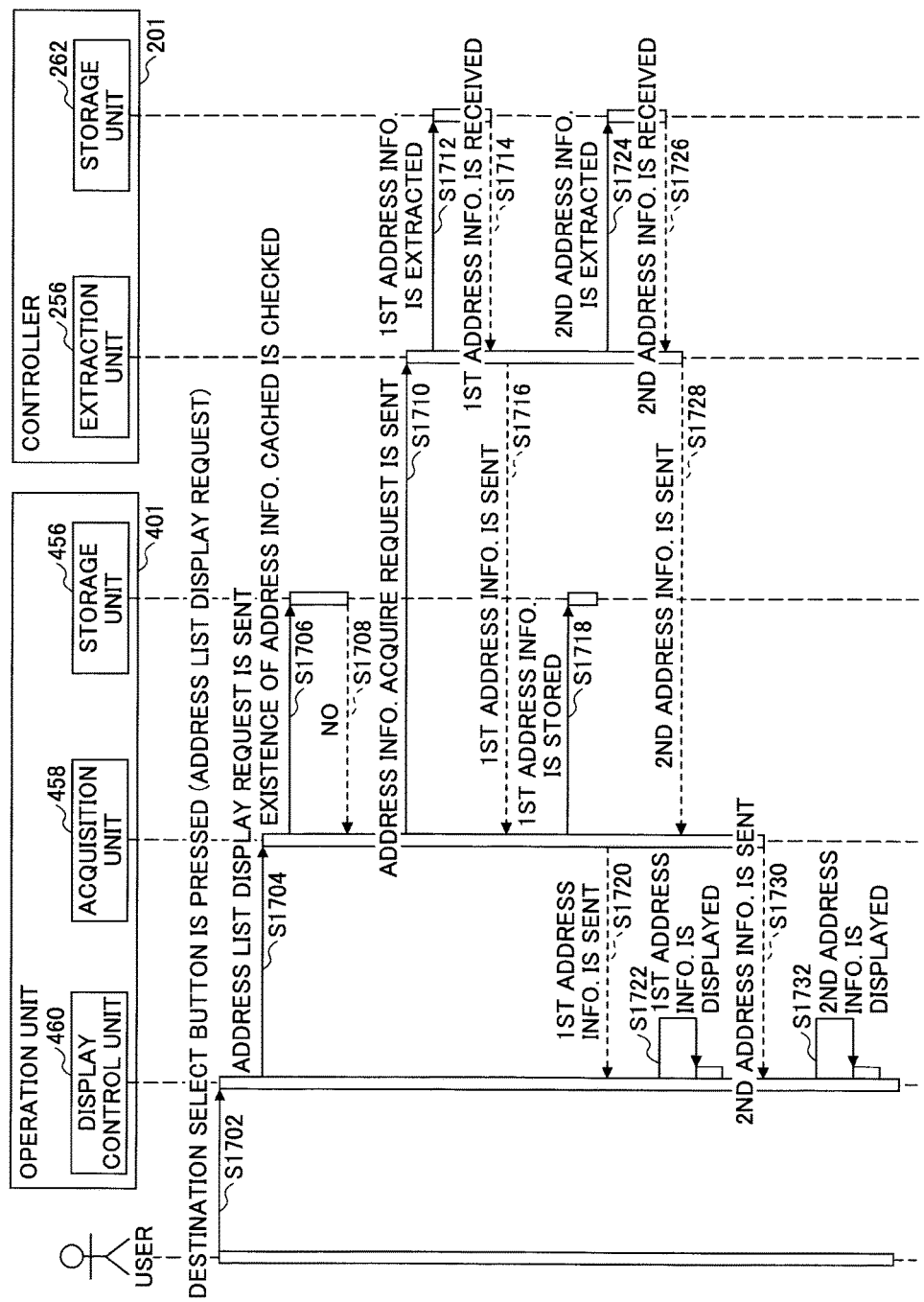

[Fig. 18]
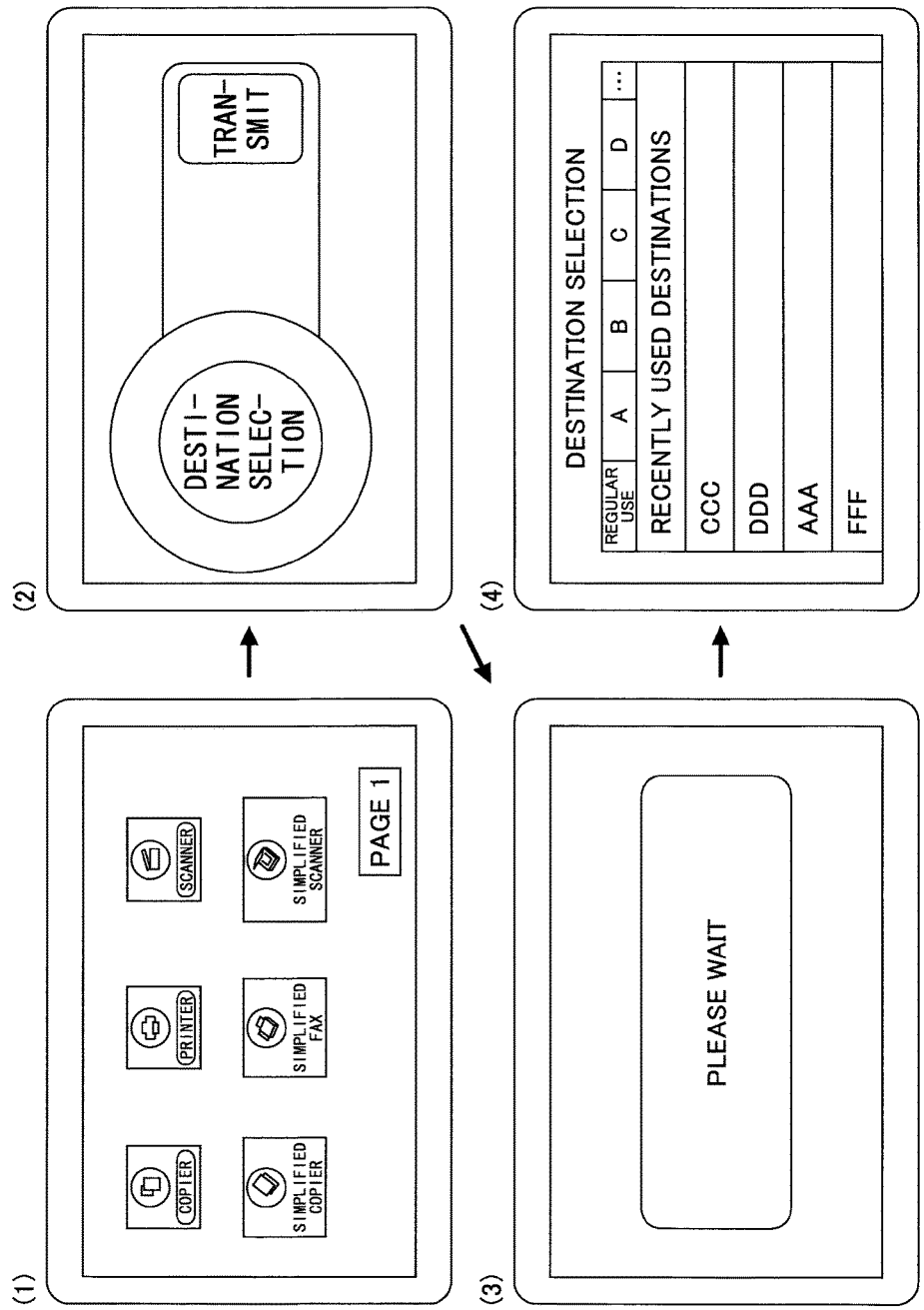

[Fig. 19]
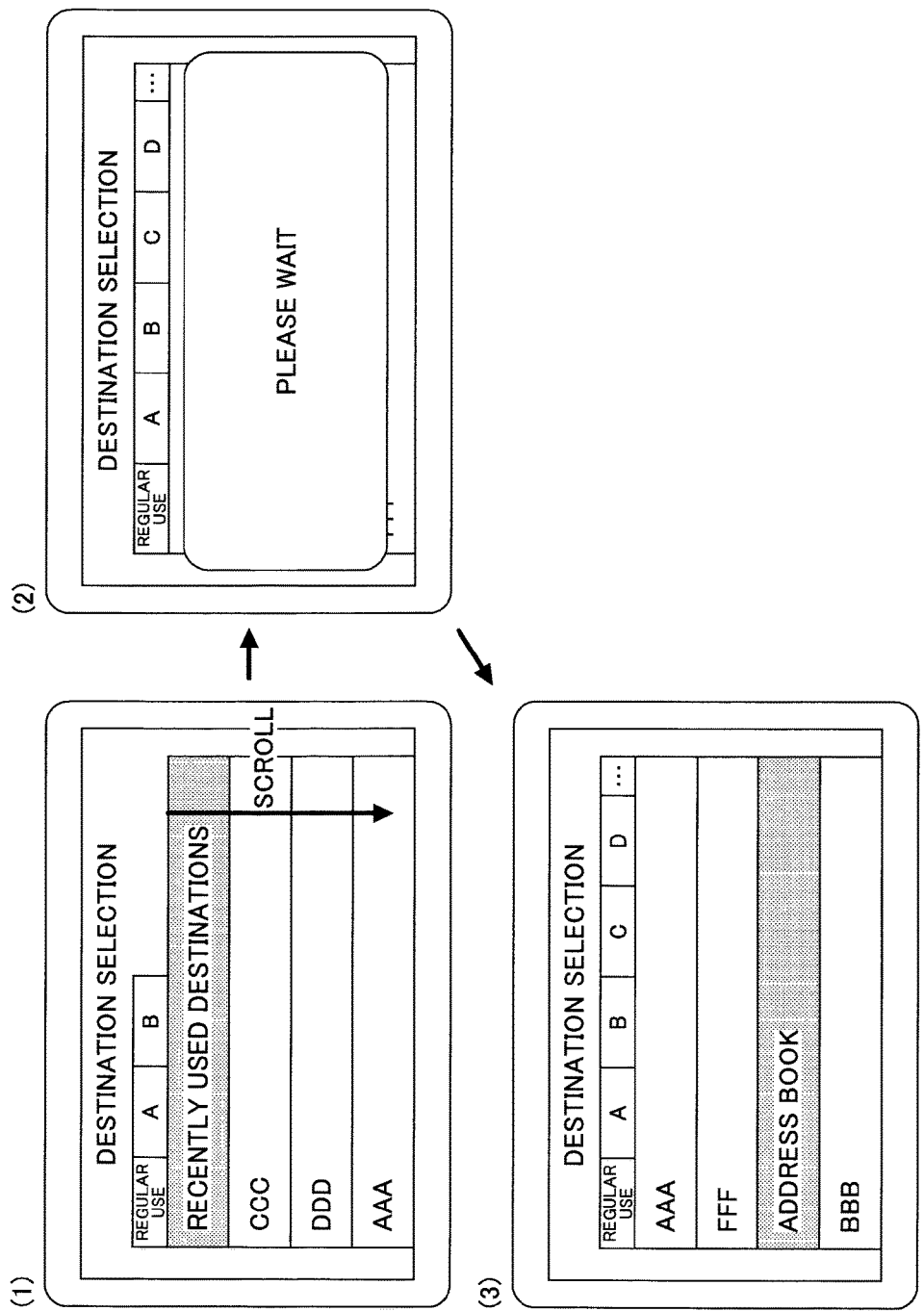

[Fig. 20]
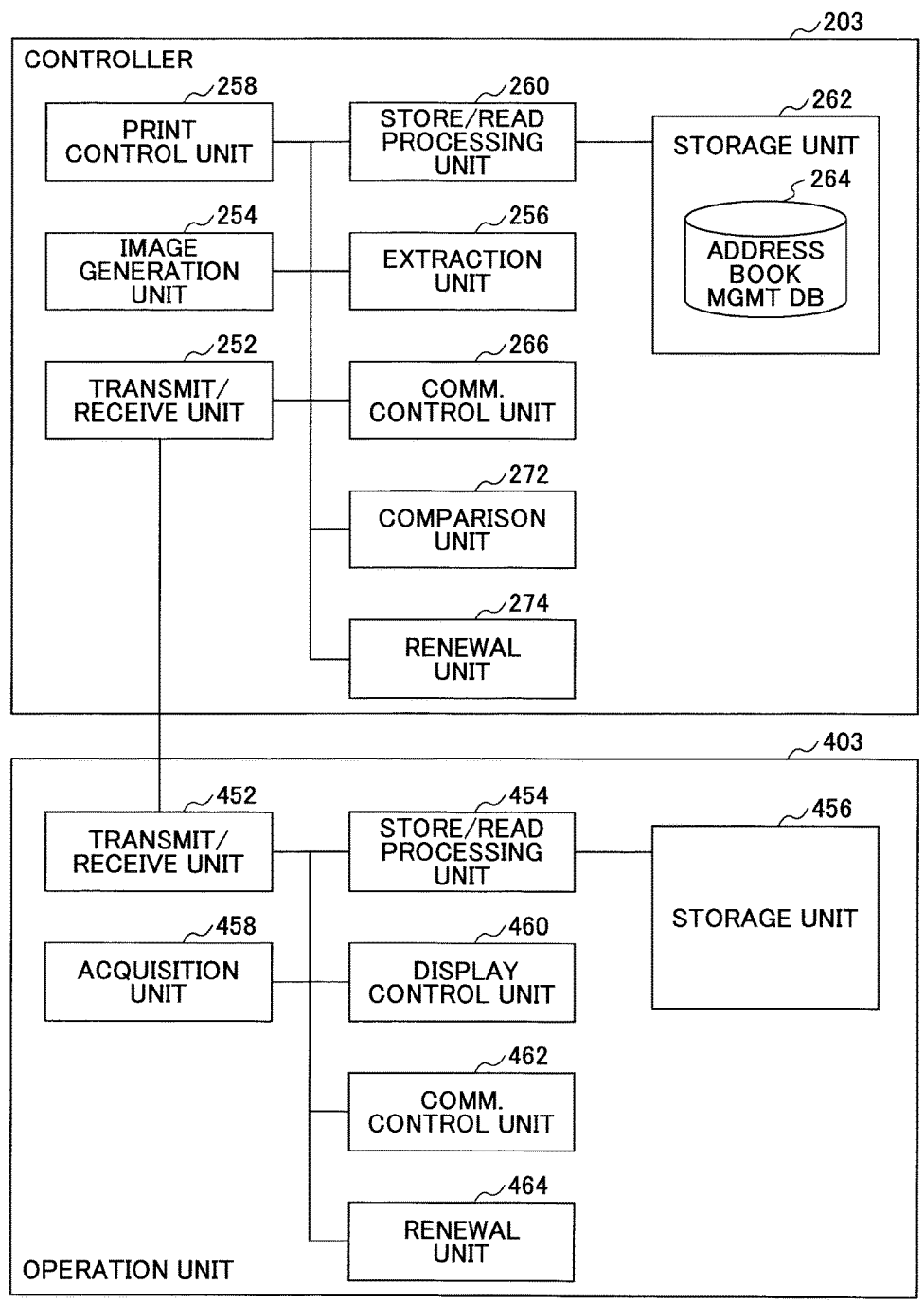

[Fig. 21]
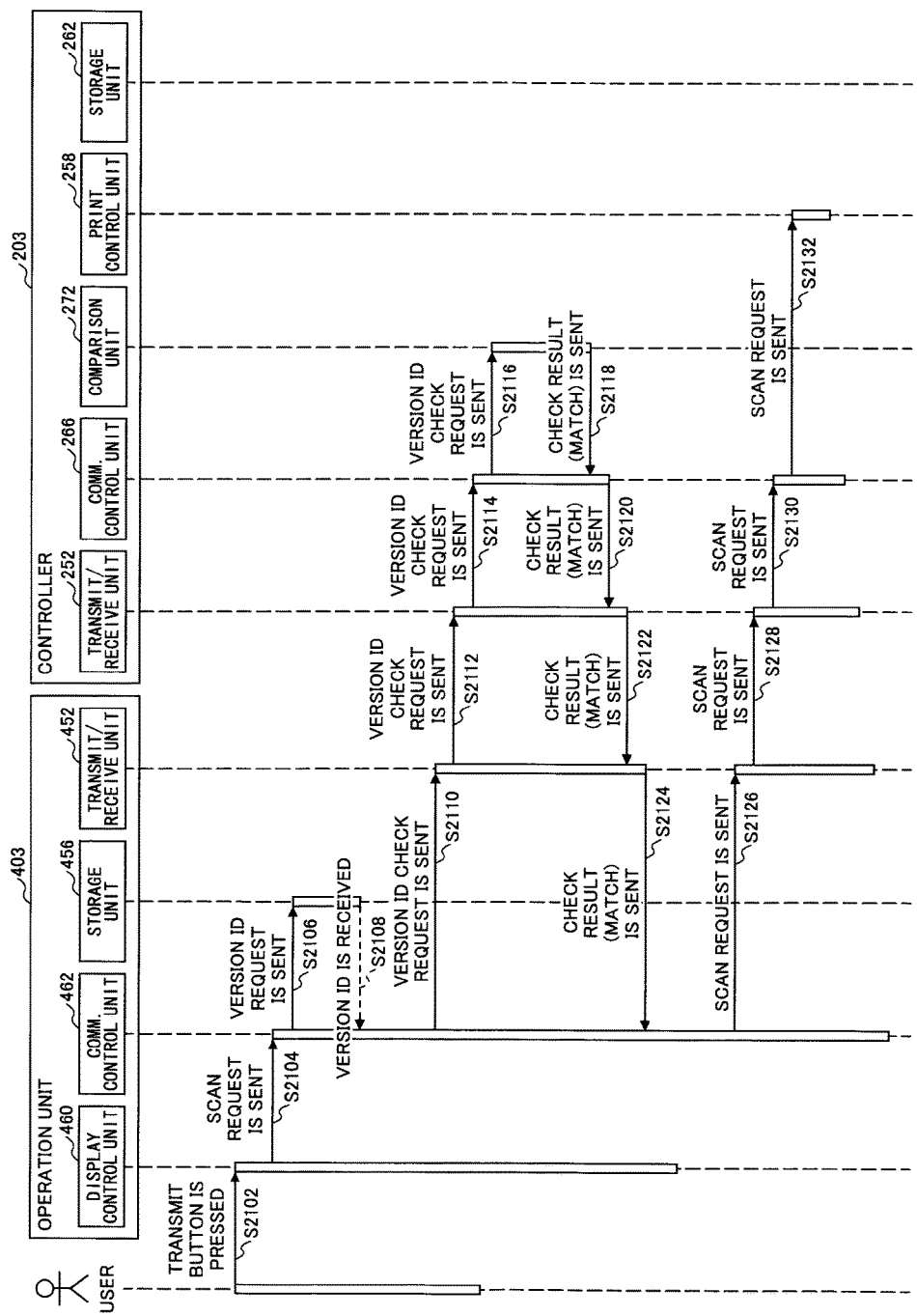

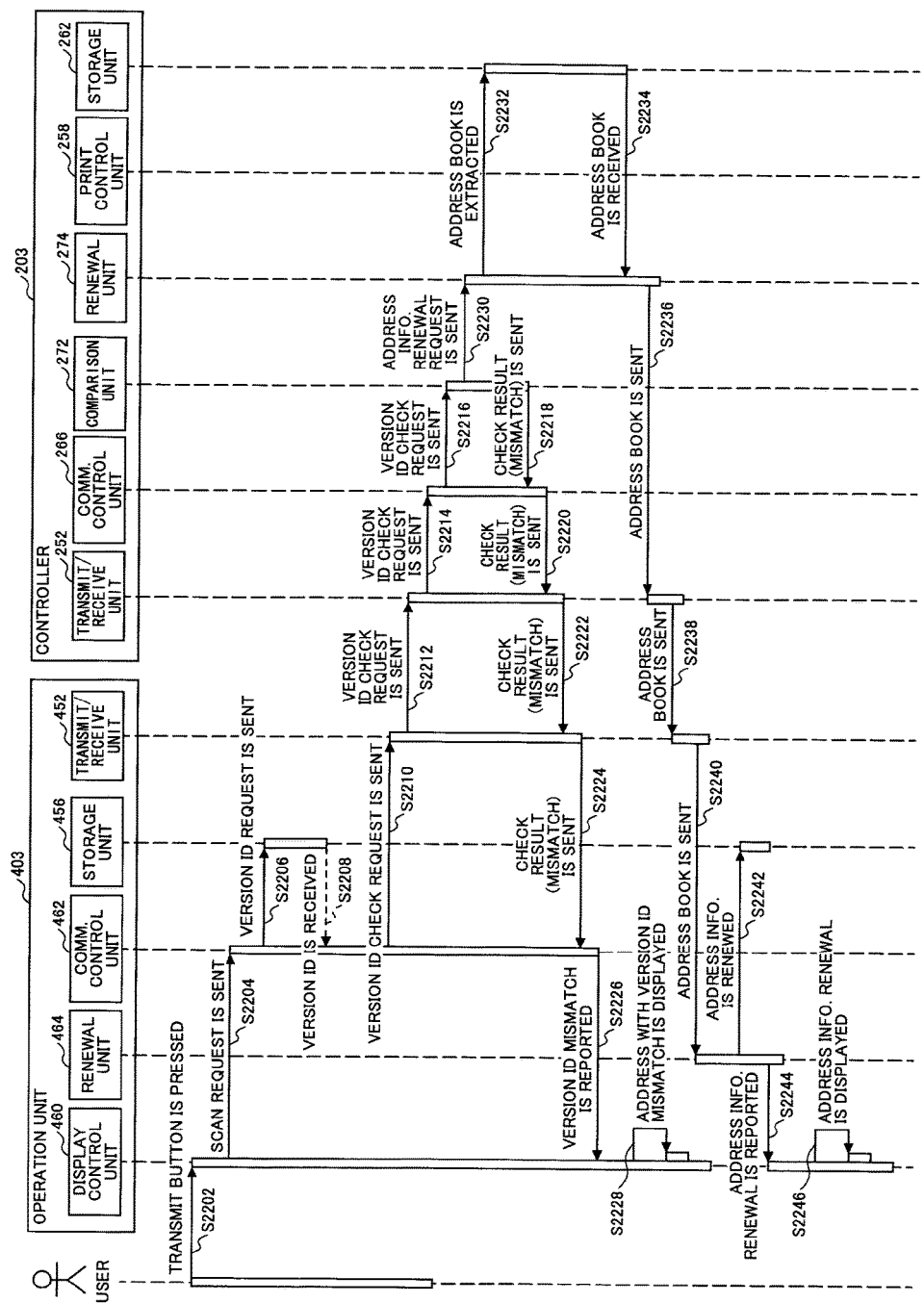
[Fig. 22]

INFORMATION PROCESSING SYSTEM, INFORMATION PROCESSING APPARATUS, INFORMATION PROCESSING METHOD, AND INFORMATION PROCESSING PROGRAM

TECHNICAL FIELD

The present invention relates to an information processing system.

BACKGROUND ART

An image forming apparatus including a controller of a main part (main control unit) and an operation unit is known. For example, see Japanese Laid-Open Patent Publication No. 2010-038998. The controller is configured to control the main portion of the image forming apparatus. The operation unit includes a control unit and a storage unit, and the operation unit may be started solely.

Further, there is also an image forming apparatus which is configured to perform mail transmission or facsimile transmission to send data obtained by a scanner or facsimile data to a destination terminal at a destination address selected from an address book.

In the image forming apparatus including the controller (main control unit) of the main part and the operation unit, input information is received by the operation unit and stored therein, and then processing of the input information will be performed after the controller is started. However, when a communication connection between the operation unit and the controller is not established, if a user requests the image forming apparatus to execute the processing of the input information received by the operation unit, the execution request will be canceled.

In the foregoing, the case of the image forming apparatus has been described. However, the above problem is not limited to the image forming apparatus. Also, in a case of an information processing system including a first information processing device configured to act as the operation unit, and a second information processing device configured to act as the main part (such as an image forming apparatus), the same problem will arise.

CITATION LIST

Patent Literature

[PTL 1] Japanese Laid-Open Patent Publication No. 2010-038998

SUMMARY OF INVENTION

In one aspect, the present invention provides an information processing apparatus including a first information processing device and a second information processing device configured to operate in response to a request from the first information processing device, the information processing apparatus being configured to perform processing of input information received by the first information processing device, without canceling execution of the job, when a communication connection between the first information processing device and the second information processing device is not established.

In one embodiment, the present invention provides an information processing system including a first information processing device and a second information processing device configured to operate based on a request received from the first information processing device, the first information processing device including a processor configured to implement a storage unit configured to store a portion of information stored in the second information processing device; and a first communication control unit configured to transmit a job execution request for execution of a predetermined job to the second information processing device based on the information stored in the second information processing device, wherein, when a communication connection between the first information processing device and the second information processing device is not established, the first communication control unit controls the transmission of the job execution request to transmit to the second information processing device the job execution request based on the portion of the information after the communication connection is established, and the second information processing device includes an execution unit configured to execute the predetermined job based on the job execution request received from the first information processing device.

The object and advantages of the invention will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 1 is a diagram showing a hardware configuration of an image processing apparatus according to one embodiment.

FIG. 2 is a diagram showing a hardware configuration of an image processing apparatus according to another embodiment.

FIG. 3 is a block diagram showing a functional configuration of an image processing apparatus according to one embodiment.

FIG. 4 is a diagram showing an example of an address book.

FIG. 5 is a diagram for explaining an outline of operation of the image processing apparatus according to the embodiment.

FIG. 6 is a sequence diagram for explaining operation of the image processing apparatus according to the embodiment.

FIG. 7 is a diagram showing an example of transition of screens displayed on an operation unit of the image processing apparatus according to one embodiment.

FIG. 8 is a sequence diagram for explaining operation of the image processing apparatus according to the embodiment.

FIG. 9 is a diagram showing an example of transition of screens displayed on the operation unit of the image processing apparatus according to one embodiment.

FIG. 10 is a diagram showing an example of transition of screens displayed on the operation unit of the image processing apparatus according to one embodiment.

FIG. 11 is a sequence diagram for explaining operation of the image processing apparatus according to the embodiment.

FIG. 12 is a diagram showing an example of transition of screens displayed on the operation unit of the image processing apparatus according to one embodiment.

FIG. 13 is a diagram showing an example of transition of screens displayed on the operation unit of the image processing apparatus according to one embodiment.

FIG. 14 is a sequence diagram for explaining operation of the image processing apparatus according to the embodiment.

FIG. 15 is a diagram showing an example of a screen displayed on the operation unit of the image processing apparatus according to one embodiment.

FIG. 16 is a block diagram showing a functional configuration of the image processing apparatus according to another embodiment.

FIG. 17 is a sequence diagram for explaining operation of the image processing apparatus according to the embodiment.

FIG. 18 is a diagram showing an example of transition of screens displayed on the operation unit of the image processing apparatus according to one embodiment.

FIG. 19 is a diagram showing an example of transition of screens displayed on the operation unit of the image processing apparatus according to one embodiment.

FIG. 20 is a block diagram showing a functional configuration of the image processing apparatus according to another embodiment.

FIG. 21 is a sequence diagram for explaining operation of the image processing apparatus according to the embodiment.

FIG. 22 is a sequence diagram for explaining operation of the image processing apparatus according to the embodiment.

DESCRIPTION OF EMBODIMENTS

In the following, preferred embodiments will be described with reference to the accompanying drawings.

First Embodiment

FIG. 1 is a diagram showing a hardware configuration of an image processing apparatus 100 according to one embodiment. The image processing apparatus 100 includes a controller 200, an engine 300, and an operation unit 400. The controller 200 is configured to carry out state management of various devices and units, and control of jobs as a main control unit. The engine 300 is configured to perform multiple functions, including a printer function, a facsimile function, a scanner function, and a copier function. The operation unit 400 includes a CPU (processor) and a memory (storage areas) which are separate from a CPU and a memory of the controller 200. The operation unit 400 is configured to control displaying of a screen and provide a UI (user interface). The controller 200 is connected to the operation unit 400 via a wired interface, such as a cable 500.

In the image processing apparatus 100 according to the embodiment, to maintain the independence of functions between the controller 200 and the operation unit 400, software modules including an OS (operating system) of the controller 200 and software modules of an OS of the operation unit 400 are separate from each other. Namely, the controller 200 and the operation unit 400 operate independently of each other by using the separate operating systems. For example, Android may be used as the OS of the operation unit 400 and Linux may be used as the OS of the controller 200. Communication between the controller 200 and the operation unit 400 may be performed by using a USB (universal serial bus) connection.

In the image processing apparatus 100 of this embodiment, the controller 200 and the operation unit 400 are configured to operate independently of each other by different operating systems, and communication between the controller 200 and the operation unit 400 is performed as communication between different devices and not as interprocess communication within a single device. For example, this communication is related to an operation (command transmission) of the operation unit 400 to transmit a command (instructions input from a user) received by the operation unit 400 to the controller 200, and an operation of the controller 200 to send a notification of an event to the operation unit 400. When the operation unit 400 performs the command transmission to the controller 200, the operation unit 400 is able to use a function of the controller 200. Moreover, the contents of information reported to the operation unit 400 by the controller 200 may include the states of operations executed by the controller 200, the contents of settings set up in the controller 200, etc.

The controller 200 includes a central processing unit (CPU) 202, a program read-only memory (ROM) 204, a network interface 206, a hard disk drive (HDD) 208, a random access memory (RAM) 210, a nonvolatile memory 212, an operation unit interface 214, and an engine interface 216.

The CPU 202 is configured to control overall operations of the controller 200, including power management operations and job management operations by the controller 200. The program ROM 204 stores a controller program related to the control operations by the controller 200. The network interface 206 is utilized by the CPU 202 to communicate with an external network 50. The HDD 208 stores various data such as an address book. The RAM 210 provides a program execution area for the CPU 202 and is used for development of print images. The nonvolatile memory 212 is used to store accumulated document data and store data required for development of print images. The operation unit interface 214 is used by the CPU 202 to communicate with the operation unit 400. The engine interface 216 is used by the CPU 202 to communicate with the engine 300.

The operation unit 400 includes a CPU 402, a program ROM 404, a controller interface 414, a RAM 410, a nonvolatile memory 412, and a display unit 416.

The CPU 402 is configured to control overall operations of the operation unit 400, such as operation related processes on the operation unit 400. The program ROM 404 stores an operation unit program related to the control operations by the operation unit 400. The controller interface 414 is utilized by the CPU 402 to communicate with the controller 200. The RAM 410 provides a program execution storage area for the CPU 402. The nonvolatile memory 412 is configured to cache address information sent from the controller 200, and store initial values of various settings used when initiating the controller 200, and items which may be set up. The display unit 416 is implemented by an electronic component in which a display such as a liquid crystal panel, and a position input device such as a touchpad are integrated. The display unit 416 is configured to display a screen to a user and receive an input operation from a user by pressing or selecting a display indication on a screen.

FIG. 2 is a diagram showing a hardware configuration of an image processing apparatus 100 according to another embodiment. In the image processing apparatus 100 shown in FIG. 1, the operation unit 400 is connected to the controller 200 by a wired connection, and the operation unit 400, the controller 200, and the engine 300 are integrated to constitute the image processing apparatus 100.

In the image processing apparatus 100 shown in FIG. 2, an operation unit interface 214 of the controller 200 and a controller interface 414 of the operation unit 400 are connected together by wireless communications. Namely, a main part 101 of the image processing apparatus, including the controller 200 and the engine 300, and the operation unit 400 are provided as separate devices.

In this embodiment, the operation unit 400 is configured to communicate with the main part 101 of the image processing apparatus by wireless communications, and a location where the operation unit 400 is disposed may be selected without constraints. The operation unit 400 receives an activation request directly from a user and operates independently of the controller 200 of the main part 101 of the image processing apparatus. The screen control process of the operation unit 400 and the connection process of the operation unit 400 with the controller 200 are asynchronously performed in parallel, and the screen operation of the operation unit 400 may be performed regardless of the operating state of the controller 200.

The operation unit 400 may be implemented by an information processing terminal, such as a smart phone or a tablet, and the operation unit 400 may perform a complete information processing operation solely. Namely, the operation unit 400 is connected to the controller 200 instead of an operation panel as a dedicated operation unit of the image processing apparatus 100. Each of the operation unit 400 and the controller 200 may be considered as an independent apparatus. In this case, the image processing apparatus 100 is an example of an apparatus on which the operation unit 400 is mounted, and the operation unit 400 may also be mounted on another information processing apparatus (or a computer configured to execute a program), not only on the image processing apparatus 100. For example, the image processing apparatus 100 may be replaced by any of a projector, a video conferencing system, and a digital camera.

Functional Configuration

Next, a functional configuration of the image processing apparatus 100 according to one embodiment will be described. FIG. 3 is a block diagram showing a functional configuration of the controller 200 and the operation unit 400 which constitute the image processing apparatus 100. As shown in FIG. 3, the controller 200 and the operation unit 400 are connected so that the controller 200 and the operation unit 400 communicate with each other by a USB connection, similar to the image processing apparatus 100 of FIG. 1. Alternatively, similar to the image processing apparatus 100 of FIG. 2, the functional configuration of FIG. 3 is also applicable to the case in which the controller 200 and the operation unit 400 are connected so that the controller 200 and the operation unit 400 may communicate with each other by wireless communications.

Functional Configuration of Controller

As shown in FIG. 3, the controller 200 includes a transmit/receive unit 252, an image generation unit 254, an extraction unit 256, a print control unit 258, a store/read processing unit 260, and a communication control unit 266. These units represent functions and units implemented by any of the elements and devices shown in FIG. 1, which are activated by instructions from the CPU 202 based on the controller program stored in the program ROM 204. Moreover, the controller 200 further includes a storage unit 262 formed of the HDD 208 shown in FIG. 1.

Address Book Management Table

An address book management database 264 formed of an address book as shown in FIG. 4 is stored in the storage unit 262. For example, in the address book shown in FIG. 4, an address identifier (ID) of each of destination addresses is associated with a display name, a mail address, a fax number, line selection information, and version information. Here, a set of information items including a destination address, an address identifier, a display name, a mail address, a fax number, line selection information, and version information will be called address information. One or more address information items are included in the address book. However, it is not necessary that the address information includes all of the destination address, the address identifier, the display name, the mail address, the fax number, the line selection information, and the version information. The line selection information is information that designates the facsimile standard, such as G3 or G4. The version information is information that identifies a renewal of each destination address having been conducted. The version information is renewed for each destination address when any of the address identifier, the display name, the mail address, the fax number, and the line selection information is altered. For example, in the address book shown in FIG. 4, an address identifier "001" of first-listed address information is associated with a mail address "A@aaa.com", a fax number "111-222-333", a display name "AAA", a line selection information "G3", and a version information "Ver.1.2". Note that the version information may be set up for each address book and may be used as information that identifies a renewal of the address book having been conducted.

Functional Units of Controller

Next, the functional units of the controller 200 will be described in more detail.

The transmit/receive unit 252 of the controller 200 is configured to transmit various data (information) to and receive various data from the operation unit 400 by the USB connection. The function of the transmit/receive unit 252 is implemented by the operation unit interface 214 shown in FIG. 1.

The image generation unit 254 of the controller 200 is configured to develop data of user jobs and draw picture images using the RAM 210. The function of the image generation unit 254 is implemented by instructions received from the CPU 202 shown in FIG. 1, the controller program stored in the program ROM 204, and the RAM 210.

The store/read processing unit 260 of the controller 200 is configured to store various data in and read such data from the storage unit 262. The function of the store/read processing unit 260 is implemented by instructions received from the CPU 202 shown in FIG. 1, the controller program stored in the program ROM 204, and the HDD 208.

The print control unit 258 of the controller 200 is configured to control the engine 300 to print on paper the picture images drawn by the image generation unit 254. The function of the print control unit 258 is implemented by instructions received from the CPU 202 shown in FIG. 1, the controller program stored in the program ROM 204, and the engine interface 216.

The extraction unit 256 of the controller 200 is configured to extract address information items from the address book stored in the address book management database 264 of the storage unit 262 in response to an address information acquire request received from the operation unit 400, and transmit the address information items to the operation unit 400 through the transmit/receive unit 252. The function of the extraction unit 256 is implemented by instructions received from the CPU 202 shown in FIG. 1, the controller program stored in the program ROM 204, and the operation unit interface 214. Here, the address information acquire request is a request for acquiring one or more address information items from the address book of the address book management database 264 stored in the storage unit 262 of the controller 200. For example, the address information items to be acquired from among two or more address information items in the address book are attached to the address information acquire request by the operation unit 400. The address information items to be acquired are designated by the number of address information items or an address information range in the address book. The address information range may be designated by the address identifiers. Specifically, the number of address information items may be designated by a numerical value, indicating the number of several addresses to several tens of addresses, and the address information range may be designated by a range designation, such as the address identifiers "001" to "010". In this case, the extraction unit 256 extracts some address information items from among the address information items in the address book in the address book management database 264 of the storage unit 262, according to the address information items attached to the address information acquire request, and causes the transmit/receive unit 252 to transmit them to the operation unit 400. As a matter of course, all the address information items in the address book may be designated as the address information items to be acquired.

The communication control unit 266 of the controller 200 is configured to establish a communication connection between the controller 200 and the operation unit 400, and configured to send to the print control unit 258, after the establishment of the communication connection, a job execution request indicating a request of execution of a job, such as a scan process, which is received from the operation unit 400. The function of the communication control unit 266 is implemented by instructions received from the CPU 202 shown in FIG. 1, the controller program stored in the program ROM 204, and the operation unit interface 214.

Functional Configuration of Operation Unit

As shown in FIG. 3, the operation unit 400 includes a transmit/receive unit 452, a store/read processing unit 454, an acquisition unit 458, a display control unit 460, and a communication control unit 462. These units represent functions and units implemented by any of the elements and devices shown in FIG. 1, which are activated by instructions from the CPU 402 based on the operation unit program stored in the program ROM 404. Moreover, the operation unit 400 further includes a storage unit 456 formed of the nonvolatile memory 412 shown in FIG. 1.

Functional Units of Operation Unit

Next, the functional units of the operation unit 400 will be described in more detail.

The transmit/receive unit 452 of the operation unit 400 is configured to transmit various data (information) to and receive various data from the controller 200 by the USB connection. The function of the transmit/receive unit 452 is implemented by the controller interface 414 shown in FIG. 1.

The store/read processing unit 454 of the operation unit 400 is configured to store various data in the storage unit 456 and read such data from the storage unit 456. The function of the store/read processing unit 454 is implemented by instructions received from the CPU 402 shown in FIG. 1.

The display control unit 460 of the operation unit 400 is configured to control the image display on the display unit 416. The function of the display control unit 460 is implemented by instructions received from the CPU 402 shown in FIG. 1 and the operation unit program stored in the program ROM 404. Moreover, the display control unit 460 is configured to send to the acquisition unit 458 operation information generated by an operation performed by a user by pressing a display indication in a screen on the display unit 416. For example, the display control unit 460 sends to the acquisition unit 458 an address list display request generated when a user performs an operation to request displaying of an address information list. The display control unit 460 displays the address information on the display unit 416 when the address information is received from the acquisition unit 458 in response to the address list display request.

The acquisition unit 458 of the operation unit 400 is configured to determine whether the address information is stored in the storage unit 456 when the address list display request is received from the display control unit 460. The function of the acquisition unit 458 is implemented by instructions received from the CPU 402 shown in FIG. 1 and the operation unit program stored in the program ROM 404. Specifically, when the address list display request is received from the display control unit 460, the acquisition unit 458 causes the store/read processing unit 454 to read the address information from the storage unit 456. When the address information can be read, the acquisition unit 458 determines that the address information is stored in the storage unit 456. On the other hand, when the address information cannot be read, the acquisition unit 458 determines that the address information is not stored in the storage unit 456. When the address information is stored in the storage unit 456, the acquisition unit 458 acquires the address information and sends the address information to the display control unit 460, and simultaneously generates an address information acquire request. In this address information acquire request, the number of address information items or the address information range in the address book may be designated as the address information items to be acquired. The acquisition unit 458 causes the transmit/receive unit 452 to transmit the address information acquire request to the controller 200.

On the other hand, when the address information is not stored in the storage unit 456, the acquisition unit 458 generates an address information acquire request. In this address information acquire request, all the address information items are designated as the address information items to be acquired. The acquisition unit 458 causes the transmit/receive unit 452 to transmit this address information acquire request to the controller 200.

When the address information is received from the controller 200 via the transmit/receive unit 452 in response to the address information acquire request and the received address information is not stored in the storage unit 456, the acquisition unit 458 stores some of the received address information into the storage unit 456. Further, the acquisition unit 458 sends the address information received from the transmit/receive unit 452 to the display control unit 460. For example, when the received address information is not stored in the storage unit 456, the acquisition unit 458 stores address information items of the first ten addresses in the address information received from the transmit/receive unit 452 into the storage unit 456. On the other hand, when the received address information is stored in the storage unit 456, the address information received from the transmit/receive unit 452 is sent to the display control unit 460.

The display control unit 460 of the operation unit 400 is configured to display the address information received from the acquisition unit 458 on the display unit 416.

The communication control unit 462 of the operation unit 400 is configured to establish a communication connection between the operation unit 400 and the controller 200 and transmit a job execution request, such as a scan request, to the controller 200 after the establishment of the communication connection. The function of the communication control unit 462 is implemented by instructions received from the CPU 402 shown in FIG. 1, the operation unit program stored in the program ROM 404, and the controller interface 414.

Moreover, the programs for the image processing apparatus 100 according to the embodiment (the controller program and the operation unit program) may be recorded in an installable format or in an executable format on a computer-readable recording medium such as a compact disc read-only memory (CD-ROM), a flexible disk (FD), a compact disc recordable (CD-R), a digital versatile disk (DVD), and a USB memory. Moreover, the programs for the image processing apparatus 100 according to the embodiment (the controller program and the operation unit program) may be supplied or distributed via a network such as the Internet. Further, the programs for the image processing apparatus 100 according to the embodiment (the controller program and the operation unit program) may be recorded on a non-volatile recording medium such as a ROM to distribute the recording medium.

Operation of Image Processing Apparatus

FIG. 5 is a diagram for explaining an outline of operation of the image processing apparatus 100 according to one embodiment.

As shown in FIG. 5, in the image processing apparatus 100 according to the embodiment, some address information items (several addresses to several tens of addresses) from among a plurality of address information items in the address book stored in the controller 200 are cached in the nonvolatile memory 412 of the operation unit 400. When a request for displaying an address information list is input by a user on the operation unit 400, the address information cached in the nonvolatile memory 412 is displayed. The operation unit 400 acquires the remaining address information items from the controller 200 in a background process, while displaying the address information items cached in the nonvolatile memory 412.

Operation of the image processing apparatus 100 according to this embodiment will be described in conjunction with screens displayed on the display unit 416 of the operation unit 400. FIG. 6 is a sequence diagram for explaining operation of the image processing apparatus 100 according to the embodiment. FIG. 7 is a diagram showing an example of transition of screens (UIs) displayed on the display unit 416 of the operation unit 400.

FIG. 6 shows the operation of the image processing apparatus 100 when the address information is not cached in the operation unit 400 upon reception of a request for displaying an address information list from a user. When the address information is not cached in the operation unit 400, the operation unit 400 acquires all the address information items from the controller 200 and caches some address information items selected out of all the address information items in the storage unit 456. While all the address information items are acquired from the controller 200, a message indicating "please wait" is displayed on the display unit 416.

In step S602, the user inputs a request of execution of a job, such as a print process, a copy process, a fax process, or a scan process, by pressing a selected icon in a HOME screen displayed on the display unit 416 of the operation unit 400. An example of the HOME screen is shown in FIG. 7 (1). The user is able to activate a selected application by selecting one of a plurality of application icons in the displayed HOME screen and pressing the selected icon. Upon activation of the application, a destination select button is displayed on the display unit 416 of the operation unit 400. An example of a screen in which the destination select button is displayed is shown in FIG. 7 (2). The user inputs a request for displaying an address information list by pressing the destination select button displayed on the display unit 416 of the operation unit 400. After the request for displaying the address information list from the user is received, the display control unit 460 of the operation unit 400 generates an address list display request.

In step S604, the display control unit 460 of the operation unit 400 sends the address list display request to the acquisition unit 458.

In step S606, the acquisition unit 458 of the operation unit 400 causes the store/read processing unit 454 to determine whether the address information is cached in the storage unit 456.

In step S608, it is determined that the address information is not cached in the storage unit 456, and the store/read processing unit 454 of the operation unit 400 reports to the acquisition unit 458 that the address information is not cached. After it is reported the address information is not cached, the acquisition unit 458 causes the display control unit 460 to display a message indicating "please wait". In response to a display command from the acquisition unit 458, the display control unit 460 displays the message indicating "please wait" on the display unit 416. An example of the screen with this message is shown in FIG. 7 (3), and this screen is temporarily displayed during a period from the determination that the address information is not cached in the storage unit 456 of the operation unit 400 to the displaying of the address information.

In step S610, the acquisition unit 458 of the operation unit 400 causes the transmit/receive unit 452 to transmit an address information acquire request for acquiring the address information to the controller 200. In this address information acquire request, all the address information items are designated as destination address information items to be acquired. The address information acquire request sent from the operation unit 400 is received by the transmit/receive unit 252 of the controller 200 and sent to the extraction unit 256.

In step S612, the extraction unit 256 of the controller 200 causes the store/read processing unit 260 to read all the address information items from the address book stored in the address book management database 264 of the storage unit 262 in response to the address information acquire request from the operation unit 400.

In step S614, the store/read processing unit 260 of the controller 200 sends all the address information items read from the address book in the address book management database 264 of the storage unit 262 to the extraction unit 256.

In step S616, the extraction unit 256 of the controller 200 causes the transmit/receive unit 252 to transmit to the operation unit 400 all the address information items of the address book received from the store/read processing unit 260. All the address information items of the address book from the controller 200 are received by the transmit/receive unit 452 of the operation unit 400, and sent to the acquisition unit 458.

In step S618, the acquisition unit 458 of the operation unit 400 stores some of all the address information items of the address book received from the controller 200 into the storage unit 456. Specifically, the acquisition unit 458 may store address information items of first ten addresses out of all the address information items of the address book into the storage unit 456.

In step S620, the acquisition unit 458 of the operation unit 400 sends all the address information items of the address book to the display control unit 460.

In step S622, the display control unit 460 of the operation unit 400 displays the address information on the display unit 416. An example of a display screen of the address information list is shown in FIG. 7 (4). The user may select a destination address by making reference to the address information list displayed on the display unit 416.

FIG. 8 is a sequence diagram for explaining operation of the information processing apparatus according to the embodiment. FIG. 9 shows an example of transition of screens (UIs) displayed on the display unit 416 of the operation unit 400.

In FIG. 8, operation of the information processing apparatus 100 when an address list display request is received from a user and the address information is already cached in the operation unit 400 is shown. Namely, the operation shown in FIG. 8 is performed after the operation shown in FIG. 6 is finished. When the address information is cached in the operation unit 400, the address information is displayed on the display unit 416.

In step S802, the user inputs a request of execution of a job, such as a copy process, a fax process, or a scan process, by pressing a selected icon in a HOME screen displayed on the display unit 416 of the operation unit 400. An example of the HOME screen is shown in FIG. 9 (1). The user is able to activate a selected application by selecting one of a plurality of application icons displayed on the HOME screen and pressing the selected icon. Upon activation of the application, a destination select button is displayed on the display unit 416 of the operation unit 400. An example of a screen in which the example of the HOME screen is displayed is shown in FIG. 9 (2). The user inputs a request for displaying an address information list by pressing the destination select button displayed on the display unit 416 of the operation unit 400. After the request for displaying the address information list is received, the display control unit 460 of the operation unit 400 generates an address list display request.

In step S804, the display control unit 460 of the operation unit 400 sends the address list display request to the acquisition unit 458.

In step S806, the acquisition unit 458 of the operation unit 400 causes the store/read processing unit 454 to determine whether address information is cached in the storage unit 456.

In step S808, it is determined that the address information is cached in the storage unit 456, and the store/read processing unit 454 of the operation unit 400 reports to the acquisition unit 458 that the address information is cached in the storage unit 456, and sends the cached address information to the acquisition unit 458. In this case, the acquisition unit 458 does not cause the display control unit 460 to display a message indicating "please wait" as shown in FIG. 7 (3). Hence, such a message is not displayed on the display unit 416.

In step S810, the acquisition unit 458 of the operation unit 400 sends to the display control unit 460 the address information received from the store/read processing unit 454.

In step S812, the display control unit 460 of the operation unit 400 displays the address information received from the store/read processing unit 454 on the display unit 416. An example of a display screen of the address information list displayed at this time is shown in FIG. 9 (3), which is similar to that shown in FIG. 7 (4). The user may select a destination address by making reference to the address information list displayed on the display unit 416.

In step S814, the acquisition unit 458 of the operation unit 400 causes the transmit/receive unit 452 to send to the controller 200 an address information acquire request for acquiring the address information. In this address information acquire request, the remaining address information items, other than the address information items cached in the storage unit 456, among all the address information items of the address book are designated as the address information items to be acquired. The address information acquire request from the operation unit 400 is received by the transmit/receive unit 252 of the controller 200 and sent to the extraction unit 256.

In step S816, the extraction unit 256 of the controller 200 causes the store/read processing unit 260 to read the remaining address information items from the address book stored in the address book management database 264 of the storage unit 262 in response to the address information acquire request received from the operation unit 400.

In step S818, the store/read processing unit 260 of the controller 200 sends the remaining address information items of the address book in the address book management database 264 of the storage unit 262 to the extraction unit 256.

In step S820, the extraction unit 256 of the controller 200 causes the transmit/receive unit 252 to transmit to the operation unit 400 the remaining address information items of the address book received from the store/read processing unit 260. The remaining address information items of the address book from the controller 200 are received by the transmit/receive unit 452 of the operation unit 400 and sent to the acquisition unit 458.

In step S822, the acquisition unit 458 of the operation unit 400 sends the remaining address information items of the address book to the display control unit 460.

Subsequently, the display control unit 460 of the operation unit 400 is able to display the address information list on the display unit 416. Namely, if the user who makes reference to the address book displayed on the display unit 416 of the operation unit 400 in step S812 performs operation to scroll the screen, the address information list is scrolled up or down in response to the scrolling operation and displayed on the display unit 416.

FIG. 10 shows an example of transition of screens displayed on the display unit 416 in response to a scrolling operation performed by a user. In this example, the scrolling operation is performed after the address information is displayed on the display unit 416 at step S812 in the sequence diagram of FIG. 8 and before the remaining address information items are acquired from the controller 200, and a transition of screens (UIs) displayed on the display unit 416 in response to the scrolling operation is shown.

When the address information list to be shifted in response to the scrolling operation performed by the user is not yet acquired in the state in which the address information is displayed on the display unit 416 at the step S812 (FIG. 10 (1)), the display control unit 460 of the operation unit 400 displays a message indicating "please wait" on the display unit 416 as shown in FIG. 10 (2). During this period for which the message is displayed, the acquisition unit 458 of the operation unit 400 acquires the remaining address information items in a background process. When such address information has been acquired, the display control unit 460 of the operation unit 400 displays the shifted address information list on the display unit 416 as shown in FIG. 10 (3).

FIG. 11 is a sequence diagram for explaining operation of the information processing apparatus according to the embodiment. FIG. 12 shows an example of transition of screens (UIs) displayed on the display unit 416 of the operation unit 400.

In FIG. 11, operation of the information processing apparatus 100 when an activation process is performed upon power-up of the image processing apparatus 100 or when an activation process is performed to return the image processing apparatus 100 from an energy saving state to its original state is illustrated. A user inputs an address list display request on the operation unit 400 and the operation unit 400 displays the cached address information. Further, the user inputs a request of execution of a job, such as a scan process, by pressing a destination address button and a transmit button on the operation unit 400 before a communication connection between the operation unit 400 and the controller 200 is established.

In step S1102, the activation process is performed upon power-up of the image processing apparatus 100, or the activation process is performed to return the image processing apparatus 100 from the energy saving state to the original state. Namely, if the image processing apparatus 100 is powered up, the activation process is performed, or the activation process is performed to return the image processing apparatus 100 from the energy saving state to the original state.

In FIG. 11, the processing of steps S1104-S1114 is essentially the same as the processing of steps S802-S812 in the diagram of FIG. 8, and a description thereof will be omitted. However, in step S1104, the user inputs a request of execution of a job, such as a scan process, by pressing a selected icon in the HOME screen displayed on the display unit 416 of the operation unit 400.

In step S1116, the user selects a destination address and presses a destination address button by making reference to the display screen of the address information list shown in FIG. 9 (3). An example of a screen indicating the destination address selected by the user (which screen will be called "destination address display screen") is shown in FIG. 12 (1). The user designates a destination address by pressing a destination address button displayed on the display unit 416 of the operation unit 400. After the destination addresses are designated, the display control unit 460 of the operation unit 400 displays the destination address display screen. In the example shown in FIG. 12 (1), "AAA" and "CCC" are designated as the destination addresses. Each time the destination address button in the address information list display screen shown in FIG. 9 (3) is pressed, the designated destination address is added as in the destination address display screen shown in FIG. 12 (1). Namely, until the designation of the destination addresses is finished, the address information list display screen and the destination address display screen are alternately displayed repeatedly.

In step S1118, the user presses the transmit button in the destination address display screen shown in FIG. 12 (1).

In step S1120, the display control unit 460 of the operation unit 400 sends a job execution request, such as a scan request, to the communication control unit 462.

In step S1122, the communication control unit 462 of the operation unit 400 sends the scan request to the transmit/receive unit 452 and causes the transmit/receive unit 452 to transmit the scan request to the controller 200.

In step S1124, a communication connection between the operation unit 400 and the controller 200 is not established, and the transmit/receive unit 452 of the operation unit 400 reports to the communication control unit 462 that the transmission of the scan request has failed.

In step S1126, the communication control unit 462 of the operation unit 400 reports to the display control unit 460 that the transmission of the scan request has failed.

In step S1128, the display control unit 460 of the operation unit 400 changes the current display screen on the display unit 416 to a display screen including a message indicating "in process of transmission" as shown in FIG. 12 (2).

In step S1130, a communication connect process is performed to establish a communication connection between the communication control unit 462 of the operation unit 400 and the communication control unit 266 of the controller 200. Namely, the communication control unit 462 of the operation unit 400 and the communication control unit 266 of the controller 200 perform the communication connect process to establish the communication connection as a background process.

In step S1132, after the communication connection between the controller 200 and the operation unit 400 is established, the communication control unit 266 of the controller 200 sends to the transmit/receive unit 252 a communication establishment notification indicating that the communication connection is established.

In step S1134, the transmit/receive unit 252 of the controller 200 transmits the communication establishment notification to the operation unit 400. Namely, the controller 200 reports to the operation unit 400 that the communication connection is established. Moreover, upon reception of the communication establishment notification from the controller 200, the operation unit 400 recognizes that the controller 200 is able to receive a request of execution of a job.

In step S1136, upon reception of the communication establishment notification from the controller 200, the transmit/receive unit 452 of the operation unit 400 sends the communication establishment notification to the communication control unit 462.

In step S1138, the communication control unit 462 of the operation unit 400 sends the scan request to the transmit/receive unit 452 by using the received notification as a trigger, and causes the transmit/receive unit 452 to transmit the scan request to the controller 200. The communication connection between the controller 200 and the operation unit 400 is already established, and the transmit/receive unit 452 can transmit the scan request received from the operation unit 400 to the controller 200.

In step S1140, the transmit/receive unit 452 of the operation unit 400 transmits the scan request to the controller 200.

In step S1142, after the scan request is received from the operation unit 400, the transmit/receive unit 252 of the controller 200 sends the scan request to the communication control unit 266.

In step S1144, the communication control unit 266 of the controller 200 sends the scan request to the print control unit 258. The print control unit 258 controls execution of the scan process in response to the scan request.

In step S1146, after the execution of the scan process is finished, the print control unit 258 of the controller 200 sends to the communication control unit 266 a scan process end notification indicating that the execution of the scan process is finished.

In step S1148, the communication control unit 266 of the controller 200 sends the scan process end notification to the transmit/receive unit 252.

In step S1150, the transmit/receive unit 252 of the controller 200 transmits the scan process end notification to the operation unit 400. The communication connection between the controller 200 and the operation unit 400 is already established, and the scan process end notification can be transmitted from the controller 200 to the operation unit 400.

In step S1152, the transmit/receive unit 452 of the operation unit 400 sends the scan process end notification to the communication control unit 462.

In step S1154, the communication control unit 462 of the operation unit 400 sends the scan process end notification to the display control unit 460.

In step S1156, the display control unit 460 of the operation unit 400 changes the display screen, indicating "in process of transmission", displayed on the display unit 416 to a display screen indicating "end of transmission". An example of the display screen indicating "end of transmission" is shown in FIG. 12 (3).

In the sequence diagram shown in FIG. 11, the processing of steps S1122-S1126 may be omitted. In such a case, after the scan request is received from the display control unit 460 and the communication establishment notification is received from the controller 200, the communication control unit 462 transmits the request of execution of a job, such as a scan request, to the controller 200. Moreover, the processing of step S1128 may be performed simultaneously with the processing of step S1120. In such a case, the display control unit 460 changes the display screen currently displayed on the display unit 416 to the display screen indicating "in process of transmission", while sending the scan request to the communication control unit 462.

Further, if an error, such as failure to establish the communication connection between the operation unit 400 and the controller 200, is detected during the period for which the message indicating "in process of transmission" is displayed, the operation unit 400 may inactivate or cancel the job execution request which has been received. When canceling the job execution request, the display control unit 460 may display additionally an error message indicating that "error is detected" as shown in FIG. 13 (1). By this error message, the user may recognize that the job execution request was canceled due to the error.

Further, during the period for which the message indicating "in process of transmission" is displayed, the operation unit 400 may display additionally an icon prompting return to a top screen, such as a HOME screen. In this case, when the icon prompting return to the top screen is pressed by the user, the operation unit 400 changes the display screen to the top screen so that the user may input a new job execution request. Moreover, after the new job execution request is received, if an error, such as failure to establish the communication connection between the operation unit 400 and the controller 200, is detected, the operation unit 400 may display additionally an error message indicating that "error is detected" as shown in FIG. 13 (2) and may cancel the new job execution request simultaneously.

FIG. 14 is a sequence diagram for explaining operation of the information processing apparatus according to the embodiment. FIG. 15 shows an example of transition of screens (UIs) displayed on the display unit 416 of the operation unit 400.

In FIG. 14, the sequence diagram shown in FIG. 11 is modified and an operation to cancel a job execution request such as a scan request, which is performed before the job execution request is transmitted from the operation unit 400 to the controller 200, is illustrated.

In FIG. 14, the processing of steps S1402-S1430 is essentially the same as the processing of steps S1102-S1130 in the diagram of FIG. 11, and a description thereof will be omitted. However, in step S1428, the display control unit 460 displays a screen including a transmission reserve button used to reserve transmission of a request of execution of a job from the operation unit 400 to the controller 200, as shown in FIG. 15 (which screen will be called "transmission reserve screen") on the display unit 416. Further, a reservation cancel button used to cancel the transmission of the request of execution of the job is displayed additionally in the transmission reserve screen. By using this transmission reserve screen, the request of execution of the job may be transmitted from the operation unit 400 to the controller 200 after the communication connection between the operation unit 400 and the controller 200 is established, and the reservation of the transmission of the job execution request may be canceled.

In step S1432, the user presses the reservation cancel button in the transmission reserve screen shown in FIG. 15.

In step S1434, the display control unit 460 of the operation unit 400 sends to the communication control unit 462 a cancellation request indicating that the transmission of the request of execution of the job is to be canceled. The communication control unit 462 cancels the transmission of the request of execution of the job in response to the cancellation request from the display control unit 460. Namely, in this case, the communication control unit 462 sets up the transmit/receive unit 452 to cancel the transmission of the received job execution request, even when the communication connection between the operation unit 400 and the controller 200 is established.

In step S1436, the communication control unit 266 of the controller 200 sends a communication establishment notification to the transmit/receive unit 252 upon establishment of the communication connection between the controller 200 and the operation unit 400.

In step S1438, the transmit/receive unit 252 of the controller 200 transmits the communication establishment notification to the operation unit 400. By transmitting this notification, the controller 200 is able to report to the operation unit 400 that the communication connection between the controller 200 and the operation unit 400 has been established.

In step S1440, the transmit/receive unit 452 of the operation unit 400 sends the communication establishment notification to the communication control unit 462.

In step S1442, the communication control unit 462 of the operation unit 400 sends the communication establishment notification to the display control unit 460.

In step S1444, the display control unit 460 of the operation unit 400 displays on the display unit 416 a message indicating that the communication connection between the operation unit 400 and the controller 200 has been established.

In the above embodiment, when the address information is not cached in the operation unit 400, an address information acquire request with some of the address information items designated may be transmitted to the controller 200, instead of transmitting an address information acquire request with all the address information items designated.

In the image processing apparatus according to the embodiment, address information items of first several addresses from among all the address information items of the address book are cached in the operation unit, and, upon reception of a request for displaying an address information list, the operation unit may display a list of the cached address information items immediately. Hence, the time from the input of the address list display request on the operation unit to the displaying of the address information list may be shortened. The remaining address information items may be acquired from the controller in the background process while the cached address information list is displayed. Hence, it is assumed that, when the user who has made reference to the address information list performs an operation to scroll the screen, the remaining address information items are acquired by the operation unit. The shifted address information list may be quickly displayed according to the scrolling operation and it is possible to provide sense of congruity for the user.

Further, even in a case where a job execution request is input by pressing the destination address button and the transmit button before a communication connection between the operation unit 400 and the controller 200 is established (or when a communication connection between the operation unit 400 and the controller 200 is not yet established), it is possible to prevent the display of an error message such as failure to transmit the job execution request to the controller 200. Namely, the operation unit 400 transmits the job execution request to the controller 200 after the communication connection between the operation unit 400 and the controller 200 is established. While the communication connection between the operation unit 400 and the controller 200 is being established, the message indicating "in process of transmission" is displayed on the operation unit 400 and the process to establish the communication connection is performed as the background process. Hence, without displaying an error message such as failure to transmit the job execution request, the execution of the requested job may be finished and it is possible to provide sense of congruity for the user.

Second Embodiment

A hardware configuration of an image processing apparatus 100 according to a second embodiment is essentially the same as those shown in FIG. 1 and FIG. 2, and a description thereof will be omitted.

Functional Configuration

Next, a functional configuration of the image processing apparatus 100 according to this embodiment will be described. FIG. 16 is a block diagram showing a functional configuration of a controller 201 and an operation unit 401 which constitute the image processing apparatus 100 according to this embodiment. As shown in FIG. 16, the controller 201 and the operation unit 401 are connected so that the controller 201 and the operation unit 401 communicate with each other by a USB connection. Alternatively, the controller 201 and the operation unit 401 may be connected so that the controller 201 and the operation unit 401 may communicate with each other by wireless communications.

Functional Configuration of Controller

As shown in FIG. 16, the controller 201 includes the transmit/receive unit 252, the image generation unit 254, the extraction unit 256, the print control unit 258, the store/read processing unit 260, the communication control unit 266, and a log management unit 268. These units represent functions and units implemented by any of the elements and devices shown in FIG. 1, which are activated by instructions from the CPU 202 based on the controller program stored in the program ROM 204. Moreover, the controller 201 further includes the storage unit 262 formed of the HDD 208 shown in FIG. 1.

The controller 201 according to this embodiment differs from the controller 200 according to the first embodiment in that the log management unit 268 and a log management database 270 stored in the storage unit 262 are provided additionally and the function of the extraction unit 256 of this embodiment differs from that of the extraction unit 256 of the first embodiment.

Log Management Table

The log management database 270 is formed of a log management table as shown in Table 1 below and stored in the storage unit 262. For example, in the log management table, an address identifier (ID) of each of destination addresses is associated with a priority. Priorities in the log management table are determined such that the highest priority is given to an address ID of a destination address used in the latest log among logs of destination addresses included in job execution requests. The priorities in the log management table are renewed such that the priority for an address ID of a newly selected destination address is set to the highest ("1") and the previously assigned priorities for address IDs of other destination addresses stored in the log management table are incremented (or lowered) respectively.

TABLE 1

| ADDRESS ID | PRIORITY |
| --- | --- |
| 003 | 1 |
| 004 | 2 |
| 002 | 3 |
| 001 | 4 |
| 007 | 5 |
| . . . | . . . |

The number of address IDs of destination addresses stored in the log management table is predetermined, and the address ID which cannot be stored in the log management table as a result of lowering the priorities (i.e., the address ID whose priority is lower than the lowest priority of the log management table) is deleted. When a destination address associated with an address ID is designated by the user after the address ID is stored in the log management table, the priority for the address ID is renewed to the highest. In Table 1 above, five address IDs are stored in the log management table. Alternatively, one to four address IDs may be stored, or six or more address IDs may be stored. It is preferable that the number of address IDs stored in the log management table is the same as the number of address information items cached in the storage unit 456 of the operation unit 401.

The function of the log management unit 268 of the controller 201 is implemented by instructions received from the CPU 202 shown in FIG. 1 and the controller program stored in the program ROM 204. The log management unit 268 is configured to associate an address ID, which is associated with a destination address (such as a mail address or a fax number) included in a job execution request received from the operation unit 401, with a priority and store the address ID in the log management table of the log management database 270. When the address ID is included in the job execution request received from the operation unit 401, the log management unit 268 associates the address ID with a priority (the highest priority) and stores the address ID in the log management table of the log management database 270.

The function of the extraction unit 256 of the controller 201 is implemented by instructions received from the CPU 202 shown in FIG. 1, the controller program stored in the program ROM 204, and the operation unit interface 214. The extraction unit 256 is configured to extract address IDs from the log management table in the log management database 270 of the storage unit 262 in response to an address information acquire request received from the operation unit 401, extract address information items associated with the address IDs (which will be called "first address information") from the address book management database 264, and cause the transmit/receive unit 252 to transmit the address information items to the operation unit 401. Further, the extraction unit 256 is configured to extract, after the first address information is transmitted to the operation unit 401, address information items other than the first address information (which will be called "second address information") from the address book management database 264 and cause the transmit/receive unit 252 to transmit the second address information to the operation unit 401. Note that the address information acquire request is a request for acquiring one or more address information items from the address book of the address book management database 264 stored in the storage unit 262 of the controller 201. For example, the address information items acquired from among all the address information items of the address book by the operation unit 401 are attached to the address information acquire request. The address information items to be acquired are designated by the number of the first address IDs in the log management table, and a range of the priorities for the address IDs in the log management table.

Functional Configuration of Operation Unit

As shown in FIG. 16, the operation unit 401 includes the transmit/receive unit 452, the store/read processing unit 454, the acquisition unit 458, the display control unit 460, and the communication control unit 462. These units represent functions and units implemented by any of the elements and devices shown in FIG. 1, which are activated by instructions from the CPU 402 based on the operation unit program stored in the program ROM 404. Moreover, the operation unit 401 further includes the storage unit 456 formed of the nonvolatile memory 412 shown in FIG. 1.

The operation unit 401 according to this embodiment differs from the operation unit 400 according to the first embodiment in the function of the acquisition unit 458.

The acquisition unit 458 is configured to store, when the first address information sent by the controller 201 in response to the address information acquire request is received from the transmit/receive unit 452 but the received first address information is not yet stored in the storage unit 456, the first address information into the storage unit 456. Further, the acquisition unit 458 is configured to send the first address information received from the transmit/receive unit 452 to the display control unit 460. When the received first address information is stored in the storage unit 456, the acquisition unit 458 sends the first address information received from the transmit/receive unit 452 to the display control unit 460 directly.

Further, the acquisition unit 458 is configured to send, when the second address information sent by the controller 201 in response to the address information acquire request is received from the transmit/receive unit 452, the second address information to the display control unit 460.

The display control unit 460 displays on the display unit 416 the first address information and the second address information received from the acquisition unit 458.

Operation of Image Processing Apparatus

FIG. 17 is a sequence diagram for explaining operation of the image processing apparatus according to the embodiment. FIG. 18 shows an example of transition of screens (UIs) displayed on the display unit 416 of the operation unit 401.

In FIG. 17, operation of the image processing apparatus 100 when the address information is not cached in the operation unit 401 upon reception of an address list display request input by a user is illustrated. When the address information is not cached in the operation unit 401, the operation unit 401 acquires the first address information from the controller 201 and caches the first address information in the storage unit 456. While the first address information is acquired from the controller 201, the message indicating "please wait" is displayed on the display unit 416.

In step S1702, the user inputs a request of execution of a job, such as a copy process, a fax process, a print process, or a scan process, by pressing a selected icon in the HOME screen displayed on the display unit 416 of the operation unit 401. An example of the HOME screen is shown in FIG. 18 (1). The user is able to activate a selected application by selecting one of the plurality of application icons in the displayed HOME screen and pressing the selected icon. Upon activation of the application, a destination select button is displayed on the display unit 416 of the operation unit 401. An example of a screen in which the destination select button is displayed is shown in FIG. 18 (2). The user inputs a request for displaying an address information list by pressing the destination select button displayed on the display unit 416 of the operation unit 401. After the request for displaying the address information list is received, the display control unit 460 of the operation unit 401 generates an address list display request.

In step S1704, the display control unit 460 of the operation unit 401 sends the address list display request to the acquisition unit 458.

In step S1706, the acquisition unit 458 of the operation unit 401 causes the store/read processing unit 454 to determine whether the address information is cached in the storage unit 456.

In step S1708, it is determined that the address information is not cached in the storage unit 456, and the store/read processing unit 454 of the operation unit 401 reports to the acquisition unit 458 that the address information is not cached. After it is reported that the address information is not cached, the acquisition unit 458 causes the display control unit 460 to display the message indicating "please wait". In response to a display command from the acquisition unit 458, the display control unit 460 displays the message indicating "please wait" on the display unit 416. An example of a screen in which the message indicating "please wait" is displayed is shown in FIG. 18 (3). This screen is temporarily displayed during a period from the determination that the address information is not cached in the storage unit 456 of the operation unit 401 to the displaying of the address information.

In step S1710, the acquisition unit 458 of the operation unit 401 causes the transmit/receive unit 452 to transmit to the controller 201 an address information acquire request for acquiring the address information. The address information acquire request sent from the operation unit 401 is received by the transmit/receive unit 252 of the controller 201 and sent to the extraction unit 256.

In step S1712, the extraction unit 256 of the controller 201 causes the store/read processing unit 260 to read the address information associated with the address IDs stored in the log management database 270 of the storage unit 262 in response to the address information acquire request from the operation unit 401.

In step S1714, the store/read processing unit 260 of the controller 201 sends to the extraction unit 256 the first address information associated with the address IDs stored in the log management database 270 and selected from among all the address information items of the address book in the address book management database 264 of the storage unit 262.

In step S1716, the extraction unit 256 of the controller 201 causes the transmit/receive unit 252 to transmit to the operation unit 401 the first address information received from the store/read processing unit 260. The first address information sent by the controller 201 is received by the transmit/receive unit 452 of the operation unit 401 and sent to the acquisition unit 458.

In step S1718, the acquisition unit 458 of the operation unit 401 stores the first address information received from the controller 201 in the storage unit 456.

In step S1720, the acquisition unit 458 of the operation unit 401 sends the first address information to the display control unit 460.

In step S1722, the display control unit 460 of the operation unit 401 displays the first address information on the display unit 416. An example of a screen in which the list of the first address information is displayed is shown in FIG. 18 (4). In the example shown in FIG. 18 (4), "CCC", "DDD", "AAA", and "FFF" are displayed as recently used destination addresses. The user may select a desired destination address from among the recently used destination addresses by making reference to the list of the first address information.

In step S1724, the extraction unit 256 of the controller 201 causes the store/read processing unit 260 to read the second address information other than the first address information from among the address information items stored in the address book management database 264 of the storage unit 262 in response to the address information acquire request from the operation unit 401.

In step S1726, the store/read processing unit 260 of the controller 201 sends the second address information to the extraction unit 256.

In step S1728, the extraction unit 256 of the controller 201 causes the transmit/receive unit 252 to transmit to the operation unit 401 the second address information received from the store/read processing unit 260. The second address information transmitted by the controller 201 is received by the transmit/receive unit 452 of the operation unit 401 and sent to the acquisition unit 458.

In step S1730, the acquisition unit 458 of the operation unit 401 sends the second address information to the display control unit 460.

In step S1732, the display control unit 460 of the operation unit 401 displays the second address information on the display unit 416. For example, the address book following the recently used destination addresses shown in FIG. 18 (4) is displayed, and the second address information is displayed following the address book.

FIG. 19 shows an example of transition of screens displayed according to a scrolling operation when the operation to scroll the screen on the display unit 416 is performed by a user. In this example, the transition of screens (UIs) displayed on the display unit 416 when the operation to scroll the screen is performed after the first address information of the recently used destination addresses is displayed on the display unit 416 at step S1722 in the sequence diagram of FIG. 17 and before the second address information is acquired from the controller 201 is shown.

When the address information to be displayed by the scrolling operation performed by the user to scroll the screen in the state where the first address information of the recently used destination addresses is displayed on the display unit 416 at step S1722 (FIG. 19 (1)) is not yet acquired, the display control unit 460 of the operation unit 401 displays the message indicating "please wait" on the display unit 416 as shown in FIG. 19 (2). During the waiting time, the acquisition unit 458 of the operation unit 401 acquires the second address information in the background process. When the second address information is acquired, the display control unit 460 of the operation unit 401 displays the second address information with a field of the address book clearly separate from the recently used destination addresses on the display unit 416 as shown in FIG. 19 (3).

On the other hand, operation of the image processing apparatus 100 according to this embodiment when the address information is already cached in the operation unit 401 upon reception of the address list display request input by the user is essentially the same as the operation as shown in FIG. 8. However, in step S810, the acquisition unit 458 of the operation unit 401 sends to the display control unit 460 the first address information received from the store/read processing unit 454.

Moreover, in step S814, the acquisition unit 458 of the operation unit 401 causes the transmit/receive unit 452 to transmit to the controller 201 an address information acquire request for acquiring address information. In this address information acquire request, the second address information other than the first address information cached in the storage unit 456 from among all the address information items of the address book is designated as the address information to be acquired. The address information acquire request sent by the operation unit 401 is received by the transmit/receive unit 252 of the controller 201 and sent to the extraction unit 256.

Furthermore, operation of the image processing apparatus 100 according to this embodiment when the activation process is performed upon power-up of the image processing apparatus 100 or when the activation process is performed to return the image processing apparatus 100 from the energy saving state to the original state is essentially the same as the operation shown in FIG. 11.

Moreover, operation of the image processing apparatus 100 according to this embodiment when the operation to cancel the job execution request, such as a scan request, is performed before the job execution request is transmitted from the operation unit 401 to the controller 201 is essentially the same as the operation shown in FIG. 14.

In the image processing apparatus according to this embodiment, several address information items of the most recently used destination addresses from among all the address information items of the address book are cached in the operation unit, and the cached address information list may be displayed immediately in response to the address list display request input on the operation unit. Further, several address information items of the most recently used destination addresses are cached in the operation unit, and the address information items with higher likelihood of being selected by the user may be displayed. Note that the address information items to be cached in the operation unit may be the address information items with high likelihood of being selected by the user, which may also include the address information items with the higher frequency of transmission to the controller during a predetermined period, and the address information items with the greater number of times of transmission to the controller for a predetermined period, not only the address information items of the most recently used destination addresses.

Accordingly, the time from the input of the address list display request on the operation unit to the displaying of the address information list may be shortened and the address information items with high likelihood of being selected by the user may be displayed. The remaining address information items other than those cached in the operation unit may be acquired from the controller in the background process while the cached address information list is displayed. Hence, it is assumed that, when the user who has made reference to the address information list performs an operation to scroll the screen, the remaining address information items are acquired by the operation unit. The shifted address information list may be quickly displayed according to the scrolling operation and it is possible to provide a sense of congruity for the user.

Further, even in a case where a job execution request is input by a user by pressing the destination address button and the transmit button when a communication connection between the operation unit 401 and the controller 201 is not established, the process to establish the communication connection is performed while the message indicating "in process of transmission" is displayed on the operation unit 401. Hence, a message of an error such as failure to transmit the job execution request is not reported and the execution of the requested job may be finished without giving the sense of incongruity to the user.

Third Embodiment

A hardware configuration of an image processing apparatus 100 according to a third embodiment is essentially the same as those shown in FIG. 1 and FIG. 2, and a description thereof will be omitted.

Functional Configuration

Next, a functional configuration of the image processing apparatus 100 according to this embodiment will be described. FIG. 20 is a block diagram showing a functional configuration of a controller 203 and an operation unit 403 which constitutes the image processing apparatus 100 according to this embodiment. As shown in FIG. 20, the controller 203 and the operation unit 403 are connected so that the controller 203 and the operation unit 403 communicate with each other by a USB connection. Alternatively, the controller 203 and the operation unit 403 may be connected so that the controller 203 and the operation unit 403 may communicate with each other by wireless communications.

Functional Configuration of Controller

As shown in FIG. 20, the controller 203 includes the transmit/receive unit 252, the image generation unit 254, the extraction unit 256, the print control unit 258, the store/read processing unit 260, the communication control unit 266, a comparison unit 272, and a renewal unit 274. These units represent functions and units implemented by any of the elements and devices shown in FIG. 1, which are activated by instructions from the CPU 202 based on the controller program stored in the program ROM 204. Moreover, the controller 203 further includes the storage unit 262 formed of the HDD 208 shown in FIG. 1.

The controllers 203 according to this embodiment differs from the controller 200 according to the first embodiment in that and the comparison unit 272 and the renewal unit 274 are provided additionally. Moreover, in the image processing apparatus 100 according to this embodiment, version information is set up for each address book, and the version information is used as information that identifies a renewal of the address book. Namely, in the image processing apparatus according to this embodiment, the version information is renewed for each destination address included in the address book when any of the address identifier, the display name, the mail address, the fax number, and the line selection information is altered.

The function of the comparison unit 272 of the controller 203 is implemented by instructions received from the CPU 202 shown in FIG. 1 and the controller program stored in the program ROM 204. The comparison unit 272 is configured to determine whether the version ID of the address book stored in the address book management database 264 of the storage unit 262 of the controller 203 matches the version ID of the address information stored in the storage unit 456 of the operation unit 403 and being transmitted from the operation unit 403. The comparison unit 272 is configured to report to the operation unit 403 a result of the determination as to whether a match between the version IDs occurs. Further, when it is determined that a mismatch between the version IDs arises, the comparison unit 272 reports to the renewal unit 274 of the mismatch between the version IDs.

The function of the renewal unit 274 of the controller 203 is implemented by instructions received from the CPU 202 shown in FIG. 1 and the controller program stored in the program ROM 204. The renewal unit 274 is configured to cause, when the comparison unit 272 has determined that a mismatch between the version IDs arises, the store/read processing unit 260 is configured to read the address book from the address book management database 264 stored in the storage unit 262, and configured to cause the transmit/receive unit 252 to transmit the read address book to the operation unit 403.

Functional Configuration of Operation Unit

As shown in FIG. 20, the operation unit 403 includes the transmit/receive unit 452, the store/read processing unit 454, the acquisition unit 458, the display control unit 460, the communication control unit 462, and a renewal unit 464. These units represent functions and units implemented by any of the elements and devices shown in FIG. 1, which are activated by instructions from the CPU 402 based on the operation unit program stored in the program ROM 404. Moreover, the operation unit 403 further includes the storage unit 456 formed of the nonvolatile memory 412 shown in FIG. 1.

The operation unit 403 according to this embodiment differs from the operation unit 400 according to the first embodiment in that the renewal unit 464 is provided additionally and the function of the communication control unit 462 of this embodiment differs from the function of the communication control unit 462 of the first embodiment.

The communication control unit 462 of this embodiment is configured to acquire the version ID of the address information cached in the storage unit 456 when a job execution request, such as a scan request, is received from the display control unit 460. The communication control unit 462 causes the transmit/receive unit 452 to transmit the acquired version ID to the controller 203. The communication control unit 462 causes the transmit/receive unit 452 to transmit a job execution request, such as a scan request, to the controller 203 when a result of the determination received from the controller 203 indicating that a match between the version IDs occurs. On the other hand, when the result of determination received from the controller 203 indicates that a mismatch between the version IDs arises, the communication control unit 462 reports to the display control unit 460 that the destination address is renewed.

The function of the renewal unit 464 of the operation unit 403 is implemented by instructions received from the CPU 402 shown in FIG. 1 and the operation unit program stored in the program ROM 404.

The renewal unit 464 is configured to renew, when the address information is received from the transmit/receive unit 452, the address information cached in the storage unit 456 by the received address information. The renewal unit 464 is configured to report to the display control unit 460 that the address information has been renewed.

Operation of Image Processing Apparatus

FIG. 21 is a sequence diagram for explaining operation of the image processing apparatus according to this embodiment.

In FIG. 21, operation of the image processing apparatus 100 when the destination address is selected by a user by pressing the destination address button and the transmit button is illustrated. Namely, the operation of the image processing apparatus 100 after the processing of steps S1104-S1116 of FIG. 11 is performed is shown. Moreover, in the sequence diagram of FIG. 21, a case where the version ID of the address book stored in the address book management database 264 of the storage unit 262 of the controller 203 matches the version ID of the address information stored in the storage unit 456 of the operation unit 403 and being transmitted by the operation unit 403 will be described.

In step S2102, the user presses the transmit button in the destination address display screen described above.

In step S2104, the display control unit 460 of the operation unit 403 sends a job execution request, such as a scan request, to the communication control unit 462.

In step S2106, the communication control unit 462 of the operation unit 403 causes the store/read processing unit 454 to read the version ID of the address information stored in the storage unit 456 when the scan request is received from the display control unit 460.

In step S2108, the communication control unit 462 of the operation unit 403 acquires the version ID of the address information stored in the storage unit 456 from the store/read processing unit 454.

In step S2110, the communication control unit 462 of the operation unit 403 sends a version ID check request which indicates a request for checking whether a match between the version IDs occurs, to the transmit/receive unit 452 for transmission to the controller 203. In this version ID check request, the version ID of the address information stored in the storage unit 456 is included.

In step S2112, the transmit/receive unit 452 of the operation unit 403 transmits the version ID check request to the controller 203.

In step S2114, the transmit/receive unit 252 of the controller 203 receives the version ID check request from the operation unit 403, and sends the version ID check request to the communication control unit 266.

In step S2116, the communication control unit 266 of the controller 203 sends the version ID check request to the comparison unit 272. The comparison unit 272 determines whether a match between the version ID included in the version ID check request and the version ID of the address book stored in the controller 203 occurs. In this case, the version ID included in the version ID check request matches the version ID of the address book stored in the controller 203.

In step S2118, the comparison unit 272 of the controller 203 sends a check result indicating that a match between the version IDs occurs to the communication control unit 266. In this check result, information indicating that the match between the version IDs occurs is included.

In step S2120, the communication control unit 266 of the controller 203 sends the check result indicating that the match between the version IDs occurs to the transmit/receive unit 252 for transmission to the operation unit 403.

In step S2122, the transmit/receive unit 252 of the controller 203 transmits the check result indicating that the match between the version IDs occurs, to the operation unit 403.

In step S2124, the transmit/receive unit 452 of the operation unit 403 receives from the controller 203 the check result indicating that the match between the version IDs occurs, and sends the check result to the communication control unit 462.

In step S2126, it is detected that the check result received from the transmit/receive unit 452 indicates that the match between the version IDs occurs, and the communication control unit 462 of the operation unit 403 sends the scan request to the transmit/receive unit 452 for transmission of the scan request to the controller 203.

In step S2128, the transmit/receive unit 452 of the operation unit 403 transmits the scan request to the controller 203.

In step S2130, the transmit/receive unit 252 of the controller 203 sends the scan request to the communication control unit 266.

In step S2132, the communication control unit 266 of the controller 203 sends the scan request to the print control unit 258. The print control unit 258 controls the scan process based on the received scan request. Subsequently, the processing of steps S1146-S1156 in the sequence diagram of FIG. 11 may be performed as a next process.

FIG. 22 is a sequence diagram for explaining operation of the image processing apparatus according to this embodiment. FIG. 22 illustrates operation of the image processing apparatus 100 when it is detected in the operation of FIG. 21 that a mismatch between the version ID of the address book stored in the address book management database 264 of the storage unit 262 of the controller 203 and the version ID of the address information stored in the storage unit 456 of the operation unit 403 and being transmitted from the operation unit 403 arises.

The processing of steps S2202-S2216 in the sequence diagram of FIG. 22 is essentially the same as the processing of steps S2102-S2116 in the sequence diagram of FIG. 21, and a description thereof will be omitted.

In step S2218, the comparison unit 272 of the controller 203 sends a check result including information indicating a mismatch of the version ID between the controller 203 and the operation unit 403 to the communication control unit 266.

In step S2220, the communication control unit 266 of the controller 203 sends the check result including the information indicating the mismatch of the version ID to the transmit/receive unit 252, for transmission of the check result to the operation unit 403.

In step S2222, the transmit/receive unit 252 of the controller 203 transmits the check result including the information indicating the mismatch of the version ID to the operation unit 403.

In step S2224, the transmit/receive unit 452 of the operation unit 403 receives the check result including the information indicating the mismatch of the version ID from the controller 203 and sends the check result to the communication control unit 462.

In step S2226, the communication control unit 462 of the operation unit 403 reports, to the display control unit 460, the mismatch of the version ID because the check result received from the transmit/receive unit 452 indicates the mismatch of the version ID.

In step S2228, the display control unit 460 causes the display unit 416 to display the address information with the mismatch of the version ID which indicates that the address information of the controller 203 is renewed.

In step S2230, in response to the check result obtained at step S2218, the comparison unit 272 of the controller 203 sends, to the renewal unit 274, an address information renewal request which indicates a request for renewal of the address information stored in the operation unit 403.

In step S2232, in response to the address information renewal request received from the comparison unit 272, the renewal unit 274 of the controller 203 causes the store/read processing unit 260 to read the address book from the address book management database 264 stored in the storage unit 262.

In step S2234, the renewal unit 274 of the controller 203 acquires the address book read from the address book management database 264 of the storage unit 262 via the store/read processing unit 260.

In step S2236, the renewal unit 274 of the controller 203 sends the acquired address book to the transmit/receive unit 252.

In step S2238, the transmit/receive unit 252 of the controller 203 transmits the address book to the operation unit 403.

In step S2240, the transmit/receive unit 452 of the operation unit 403 receives the address book from the controller 203 and sends the address book to the renewal unit 464.

In step S2242, the renewal unit 464 of the operation unit 403 renews the address information stored in the storage unit 456 with the associated address information of the address book received from the transmit/receive unit 452.

In step S2244, the renewal unit 464 of the operation unit 403 sends an address information renewal notification, indicating the renewal of the related address information, to the display control unit 460.

In step S2246, the display control unit 460 of the operation unit 403 displays the information indicating that the related address information has been renewed.

For subsequent steps of the processing of FIG. 22, the corresponding steps in the processing of FIG. 11 described above may be performed. Alternatively, in the sequence diagram shown in FIG. 22, the processing of steps S2230-S2246 may be performed concurrent with the processing of steps S2218-S2228 in a parallel processing fashion.

According to the above embodiment, the image processing apparatus determines whether the version ID of the address information of the operation unit matches the version ID of the address book stored in the controller, and when a mismatch occurs, the transmission of a request of execution of a job from the operation unit to the controller is inhibited. Hence, when the version ID of the address information of the operation unit does not match the version ID of the address book stored in the controller, it is possible to prevent the request of execution of the job from being transmitted to an apparatus with a wrong destination address due to obsolete address information of the operation unit.

Further, the functions and units of the foregoing embodiments may be combined together in a suitable manner.

Further, according to the above embodiment, the controller and the operation unit may be integrated in a single computer, or various functions and units of the controller and the operation unit may be separately arranged in two or more computers.

Moreover, according to the above embodiment, a recording medium, such as CD-ROM, storing the controller program and the operation unit program, and a hard disk (HD), a storage medium or a flash memory, storing these programs, may be distributed to users domestically and abroad as a program product.

In the foregoing embodiments, the image processing apparatus is an example of the information processing system, the operation unit is an example of the first information processing device or the first information processing unit, and the controller is an example of the second information processing device or the second information processing unit. Moreover, the storage unit 456 is an example of the storage unit, the address information is an example of information, the communication control unit 462 is an example of the first communication control unit, the print control unit 258 and the image generation unit 254 are examples of the execution unit, and the display control unit 460 is an example of the display control unit.

Moreover, in the foregoing embodiments, the communication control unit 266 is an example of the second communication control unit, the comparison unit 272 is an example of the comparison unit, and the check result is an example of a result of determination. Further, the version ID of the address information stored in the storage unit 456 is an example of an identifier to identify renewal of a portion of the information, and the version ID of the address book stored in the address book management database 264 is an example of an identifier to identify renewal of information. Moreover, the controller program and the operation unit program are examples of the information processing program.

According to the above embodiment, in an information processing apparatus including a first information processing device and a second information processing device configured to operate in response to a request from the first information processing device, even when a communication connection between the first information processing device and the second information processing device is not established, it is possible to perform processing of input information received by the first information processing device without canceling execution of the processing.

The information processing apparatus according to the invention is not limited to the above-described embodiments, and various variations and modifications may be made without departing from the scope of the invention.

The present application is based upon and claims the benefit of priority of Japanese Patent Application No. 2015-098937, filed on May 14, 2015, the contents of which are incorporated herein by reference in their entirety.

REFERENCE SIGNS LIST 50 network
100, 101 image processing apparatus
200, 201, 203 controller
202, 402 CPU
204, 404 program ROM
206 network interface
208 HDD
210, 410 RAM
212, 412 nonvolatile memory 214 operation unit interface
216 engine interface
252 transmit/receive unit
254 image generation unit
256 extraction unit
258 print control unit
260 store/read processing unit
262 storage unit
264 address book management database
266 communication control unit
268 log management unit
270 log management database
272 comparison unit
274 renewal unit
300 engine
400, 401, 403 operation unit
402 CPU
414 controller interface
416 display unit
452 transmit/receive unit
454 store/read processing unit
456 storage unit
458 acquisition unit
460 display control unit
462 communication control unit
464 renewal unit

The invention claimed is:

1. An image processing apparatus comprising:
an operation device that includes
   an operation panel,
   a first processor, and
   a memory; and
a controller device configured to be operated based on a request that is input via the operation panel of the operation device, wherein
   the first processor is configured to
      receive a portion of information stored in the controller device,
      store the received portion of information at the operation device, and
      transmit a job execution request to execute an image processing job to the controller device based on the information stored in the operation device, wherein
   when a communication connection between the operation device and the controller device is not established, the first processor does not transmit the job execution request, and
   when the communication connection is established, the controller device sends a communication establishment notification to the operation device that the communication connection is established, and, after receiving the communication establishment notification, the first processor controls the job execution request based on the portion of the information to transmit to the controller device, and
   the controller device includes a second processor configured to execute the image processing job based on the job execution request received from the operation device.

2. The image processing apparatus according to claim 1, wherein
the second processor is further configured to
   establish, when an activation process of the image processing apparatus is performed, the communication connection between the operation device and the controller device, and
   transmit a communication establishment notification to the operation device; and
the first processor is further configured to transmit the job execution request based on the portion of the information to transmit to the second information processing device after the communication establishment notification is received.

3. The image processing apparatus according to claim 1, wherein the first processor is further configured to
display a message indicating in process of transmission of the job execution request when an operation is performed by a user on the operation device and the communication connection between the operation device and the controller device is not established.

4. The image processing apparatus according to claim 1, wherein the portion of the information comprises an information item previously transmitted with the job execution request.

5. The image processing apparatus according to claim 4, wherein the portion of the information comprises an information item selected from the information stored in the controller device, based on a log of the information item previously transmitted with the job execution request.

6. The image processing apparatus according to claim 4, wherein the portion of the information comprises an information item selected from the information stored in the controller device, based on a frequency of transmission of the information item previously transmitted with the job execution request.

7. The image processing apparatus according to claim 1, wherein the first is further configured to
cancel the transmission of the job execution request when the communication connection between the operation device and the controller device is not established.

8. The image processing apparatus according to claim 1, wherein
the first processor is further configured to
   transmit version information for identifying a renewal of the portion of the information stored in the storage unit to the controller device before transmitting the job execution request;
the second processor is further configured to
   determine whether first version information for identifying a renewal of the portion of the information which is to be transmitted by the operation device matches second version information for identifying a renewal of the information stored in the controller device, and
   transmit a result of the determination to the operation device; and
the first processor is further configured to transmit the job execution request to the controller device when the result of the determination indicates a match between the first version information and the second version information.

9. The image processing apparatus according to claim 1, wherein
the first processor is further configured to
   transmit version information for identifying a renewal of the portion of the information stored in the storage unit to the controller device before transmitting the job execution request;
the second processor is further configured to
   determine whether first version information for identifying a renewal of the portion of the information, which is to be transmitted by the operation device, matches second version information for identifying a renewal of the information stored in the controller device, and transmit a result of the determination operation device; and the first processor is further configured to display a message indicating the renewal of the information stored in the controller device when the result of determination indicates a mismatch between the first version information and the second version information.

10. The image processing apparatus according to claim 1, wherein the information stored in the controller device is address information.

11. The image processing apparatus according to claim 1, wherein reception of the job execution request causes the controller device to execute any of a print process, a copy process, a facsimile process, and a scan process.

12. An information processing method performed by an image processing apparatus including an operation device that includes an operation panel, a first processor, and a memory; and a controller device configured to be operated based on a request that is input via the operation panel of the operation device, the method comprising:

receiving, by the operation device, a portion of information stored in the controller device;

storing, by the operation device, the portion of information received from the controller device; and transmitting a job execution request to execute an image processing job to the controller device based on the information stored in the operation device, wherein when a communication connection between the operation device and the controller device is not established, the operation device does not transmit the job execution request, and when the communication connection is established, the controller device sends a communication establishment notification to the operation device that the communication connection is established, and, after receiving the communication establishment notification, the first processor controls the job execution request based on the portion of the information to transmit to the controller device; and the controller device includes a second processor configured to execute the image processing job based on the job execution request received from the operation device.

13. A non-transitory computer-readable recording medium having a program recorded thereon that is executable by a computer, the program when executed causes the computer to perform the information processing method according to claim 12.

* * * * *